(12) United States Patent
Konishi

(10) Patent No.: US 10,015,386 B2
(45) Date of Patent: Jul. 3, 2018

(54) FOCUS CONTROL APPARATUS, IMAGE CAPTURING APPARATUS, INTERCHANGEABLE LENS, FOCUS CONTROL METHOD, AND STORAGE MEDIUM STORING FOCUS CONTROL PROGRAM

(71) Applicant: CANON KABUSHIKI KAISHA, Tokyo (JP)

(72) Inventor: Kazuki Konishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 14/845,299

(22) Filed: Sep. 4, 2015

(65) Prior Publication Data
US 2016/0073007 A1 Mar. 10, 2016

(30) Foreign Application Priority Data

Sep. 9, 2014 (JP) .................................. 2014-183103

(51) Int. Cl.
*H04N 5/232* (2006.01)
*H04N 5/225* (2006.01)
*H04N 5/369* (2011.01)

(52) U.S. Cl.
CPC ....... *H04N 5/23212* (2013.01); *H04N 5/2254* (2013.01); *H04N 5/23209* (2013.01); *H04N 5/3696* (2013.01)

(58) Field of Classification Search
CPC ............. H04N 5/2254; H04N 5/23209; H04N 5/23212; H04N 5/3696; G03B 17/14
See application file for complete search history.

(56) References Cited

U.S. PATENT DOCUMENTS 5,128,705 A 7/1992 Someya et al.
5,313,245 A 5/1994 Konishi
(Continued)

FOREIGN PATENT DOCUMENTS

JP 2004-101766 A 4/2004
JP 2004-102130 A 4/2004
(Continued)

*Primary Examiner* — Dennis Hogue
(74) *Attorney, Agent, or Firm* — Fitzpatrick, Cella, Harper & Scinto

(57) ABSTRACT

The focus control apparatus performs focus control of the interchangeable lens by using information obtained through detection of a focus state of an interchangeable lens and a correction value corresponding to the interchangeable lens. The interchangeable lens is a first interchangeable lens holding unique correction value calculation data used to calculate the correction value, or a second interchangeable lens not holding the correction value calculation data. The focus control apparatus includes a first memory storing values for calculating the correction value corresponding to the second interchangeable lens. A controller calculates the correction value by using the correction value calculated based on the values read from the first memory when the second interchangeable lens is attached to the image capturing apparatus, and by using the correction value calculation data acquired from the first interchangeable lens when the first interchangeable lens is attached to the image capturing apparatus.

10 Claims, 12 Drawing Sheets

FOCUS LENS POSITION

(56) References Cited

U.S. PATENT DOCUMENTS

| | | |
|---|---|---|
| 5,422,700 A | 6/1995 | Suda et al. |
| 6,229,959 B1 | 5/2001 | Suda et al. |
| 7,411,624 B2 | 8/2008 | Konishi et al. |
| 2003/0048374 A1* | 3/2003 | Minakuti ............ H04N 5/23209 348/360 |
| 2007/0189730 A1* | 8/2007 | Okamura ............ H04N 5/23209 386/240 |
| 2008/0240709 A1* | 10/2008 | Nakamura ............. H04N 5/225 396/529 |
| 2010/0026875 A1* | 2/2010 | Shirai .................... G03B 17/18 348/335 |
| 2010/0103284 A1* | 4/2010 | Sugimori ............ H04N 5/23209 348/231.3 |
| 2010/0110217 A1* | 5/2010 | Shibuno ............. H04N 5/23209 348/222.1 |
| 2011/0249154 A1* | 10/2011 | Kawase ................. G03B 17/14 348/242 |
| 2013/0194485 A1* | 8/2013 | Maruyama ........... H04N 9/7908 348/345 |
| 2014/0036134 A1* | 2/2014 | Miyatani ............ H04N 5/23212 348/345 |
| 2014/0071336 A1* | 3/2014 | Takanashi .......... H04N 5/23209 348/360 |

FOREIGN PATENT DOCUMENTS

| | | |
|---|---|---|
| JP | 2004-347665 A | 12/2004 |
| JP | 2006-135513 A | 5/2006 |

\* cited by examiner

COLOR_GREEN, ZOOM(0)=WIDE, FOCUS POSITION:FAR, HORIZONTAL(H)

| FREQUENCY IMAGE HEIGHT | Freq 0 (LOW BAND) | Freq 1 | Freq 2 | Freq 3 | Freq 4 | Freq 5 | Freq 6 | Freq 7 | Freq 8 | Freq 9 (HIGH BAND) |
|---|---|---|---|---|---|---|---|---|---|---|
| (0,0) | gPxyH (0,0, freq0) | gPxyH (0,0, freq1) | gPxyH (0,0, freq2) | gPxyH (0,0, freq3) | gPxyH (0,0, freq4) | gPxyH (0,0, freq5) | gPxyH (0,0, freq6) | gPxyH (0,0, freq7) | gPxyH (0,0, freq8) | 0 (BASE) |
| (x1,0) | gPxyH (x1,0, freq0) | gPxyH (x1,0, freq1) | gPxyH (x1,0, freq2) | gPxyH (x1,0, freq3) | gPxyH (x1,0, freq4) | gPxyH (x1,0, freq5) | gPxyH (x1,0, freq6) | gPxyH (x1,0, freq7) | gPxyH (x1,0, freq8) | gPxyH (x1,0, freq9) |
| (x2,0) | gPxyH (x2,0, freq0) | gPxyH (x2,0, freq1) | gPxyH (x2,0, freq2) | gPxyH (x2,0, freq3) | gPxyH (x2,0, freq4) | gPxyH (x2,0, freq5) | gPxyH (x2,0, freq6) | gPxyH (x2,0, freq7) | gPxyH (x2,0, freq8) | gPxyH (x2,0, freq9) |
| (0,y1) | gPxyH (0,y1, freq0) | gPxyH (0,y1, freq1) | gPxyH (0,y1, freq2) | gPxyH (0,y1, freq3) | gPxyH (0,y1, freq4) | gPxyH (0,y1, freq5) | gPxyH (0,y1, freq6) | gPxyH (0,y1, freq7) | gPxyH (0,y1, freq8) | gPxyH (0,y1, freq9) |
| (0,y2) | gPxyH (0,y2, freq0) | gPxyH (0,y2, freq1) | gPxyH (0,y2, freq2) | gPxyH (0,y2, freq3) | gPxyH (0,y2, freq4) | gPxyH (0,y2, freq5) | gPxyH (0,y2, freq6) | gPxyH (0,y2, freq7) | gPxyH (0,y2, freq8) | gPxyH (0,y2, freq9) |

FIG. 4A

COLOR_RED, ZOOM(0)=WIDE, FOCUS POSITION:FAR, HORIZONTAL(H)

| FREQUENCY<br>IMAGE HEIGHT | Freq 0<br>(LOW BAND) | Freq 1 | Freq 2 | Freq 3 | Freq 4 | Freq 5 | Freq 6 | Freq 7 | Freq 8 | Freq 9<br>(HIGH BAND) |
|---|---|---|---|---|---|---|---|---|---|---|
| (0,0) | rPxyH<br>(0,0,<br>freq0) | rPxyH<br>(0,0,<br>freq1) | rPxyH<br>(0,0,<br>freq2) | rPxyH<br>(0,0,<br>freq3) | rPxyH<br>(0,0,<br>freq4) | rPxyH<br>(0,0,<br>freq5) | rPxyH<br>(0,0,<br>freq6) | rPxyH<br>(0,0,<br>freq7) | rPxyH<br>(0,0,<br>freq8) | 0<br>(BASE) |
| (x1,0) | rPxyH<br>(x1,0,<br>freq0) | rPxyH<br>(x1,0,<br>freq1) | rPxyH<br>(x1,0,<br>freq2) | rPxyH<br>(x1,0,<br>freq3) | rPxyH<br>(x1,0,<br>freq4) | rPxyH<br>(x1,0,<br>freq5) | rPxyH<br>(x1,0,<br>freq6) | rPxyH<br>(x1,0,<br>freq7) | rPxyH<br>(x1,0,<br>freq8) | rPxyH<br>(x1,0,<br>freq9) |
| (x2,0) | rPxyH<br>(x2,0,<br>freq0) | rPxyH<br>(x2,0,<br>freq1) | rPxyH<br>(x2,0,<br>freq2) | rPxyH<br>(x2,0,<br>freq3) | rPxyH<br>(x2,0,<br>freq4) | rPxyH<br>(x2,0,<br>freq5) | rPxyH<br>(x2,0,<br>freq6) | rPxyH<br>(x2,0,<br>freq7) | rPxyH<br>(x2,0,<br>freq8) | rPxyH<br>(x2,0,<br>freq9) |
| (0,y1) | rPxyH<br>(0,y1,<br>freq0) | rPxyH<br>(0,y1,<br>freq1) | rPxyH<br>(0,y1,<br>freq2) | rPxyH<br>(0,y1,<br>freq3) | rPxyH<br>(0,y1,<br>freq4) | rPxyH<br>(0,y1,<br>freq5) | rPxyH<br>(0,y1,<br>freq6) | rPxyH<br>(0,y1,<br>freq7) | rPxyH<br>(0,y1,<br>freq8) | rPxyH<br>(0,y1,<br>freq9) |
| (0,y2) | rPxyH<br>(0,y2,<br>freq0) | rPxyH<br>(0,y2,<br>freq1) | rPxyH<br>(0,y2,<br>freq2) | rPxyH<br>(0,y2,<br>freq3) | rPxyH<br>(0,y2,<br>freq4) | rPxyH<br>(0,y2,<br>freq5) | rPxyH<br>(0,y2,<br>freq6) | rPxyH<br>(0,y2,<br>freq7) | rPxyH<br>(0,y2,<br>freq8) | rPxyH<br>(0,y2,<br>freq9) |

FIG. 4B

COLOR BLUE, ZOOM(0)=WIDE, FOCUS POSITION:FAR, HORIZONTAL(H)

| FREQUENCY<br>IMAGE HEIGHT | Freq 0<br>(LOW BAND) | Freq 1 | Freq 2 | Freq 3 | Freq 4 | Freq 5 | Freq 6 | Freq 7 | Freq 8 | Freq 9<br>(HIGH BAND) |
|---|---|---|---|---|---|---|---|---|---|---|
| (0,0) | bPxyH<br>(0,0,<br>freq0) | bPxyH<br>(0,0,<br>freq1) | bPxyH<br>(0,0,<br>freq2) | bPxyH<br>(0,0,<br>freq3) | bPxyH<br>(0,0,<br>freq4) | bPxyH<br>(0,0,<br>freq5) | bPxyH<br>(0,0,<br>freq6) | bPxyH<br>(0,0,<br>freq7) | bPxyH<br>(0,0,<br>freq8) | 0<br>(BASE) |
| (x1,0) | bPxyH<br>(x1,0,<br>freq0) | bPxyH<br>(x1,0,<br>freq1) | bPxyH<br>(x1,0,<br>freq2) | bPxyH<br>(x1,0,<br>freq3) | bPxyH<br>(x1,0,<br>freq4) | bPxyH<br>(x1,0,<br>freq5) | bPxyH<br>(x1,0,<br>freq6) | bPxyH<br>(x1,0,<br>freq7) | bPxyH<br>(x1,0,<br>freq8) | bPxyH<br>(x1,0,<br>freq9) |
| (x2,0) | bPxyH<br>(x2,0,<br>freq0) | bPxyH<br>(x2,0,<br>freq1) | bPxyH<br>(x2,0,<br>freq2) | bPxyH<br>(x2,0,<br>freq3) | bPxyH<br>(x2,0,<br>freq4) | bPxyH<br>(x2,0,<br>freq5) | bPxyH<br>(x2,0,<br>freq6) | bPxyH<br>(x2,0,<br>freq7) | bPxyH<br>(x2,0,<br>freq8) | bPxyH<br>(x2,0,<br>freq9) |
| (0,y1) | bPxyH<br>(0,y1,<br>freq0) | bPxyH<br>(0,y1,<br>freq1) | bPxyH<br>(0,y1,<br>freq2) | bPxyH<br>(0,y1,<br>freq3) | bPxyH<br>(0,y1,<br>freq4) | bPxyH<br>(0,y1,<br>freq5) | bPxyH<br>(0,y1,<br>freq6) | bPxyH<br>(0,y1,<br>freq7) | bPxyH<br>(0,y1,<br>freq8) | bPxyH<br>(0,y1,<br>freq9) |
| (0,y2) | bPxyH<br>(0,y2,<br>freq0) | bPxyH<br>(0,y2,<br>freq1) | bPxyH<br>(0,y2,<br>freq2) | bPxyH<br>(0,y2,<br>freq3) | bPxyH<br>(0,y2,<br>freq4) | bPxyH<br>(0,y2,<br>freq5) | bPxyH<br>(0,y2,<br>freq6) | bPxyH<br>(0,y2,<br>freq7) | bPxyH<br>(0,y2,<br>freq8) | bPxyH<br>(0,y2,<br>freq9) |

FIG. 4C

COLOR GREEN, ZOOM(0)=WIDE, FOCUS POSITION:FAR, HORIZONTAL(H)

| FREQUENCY IMAGE HEIGHT | Freq 0 (LOW BAND) | Freq 1 | Freq 2 | Freq 3 | Freq 4 | Freq 5 | Freq 6 | Freq 7 | Freq 8 | Freq 9 (HIGH BAND) |
|---|---|---|---|---|---|---|---|---|---|---|
| (0,0) | gPxyH (0,0, freq0) | gPxyH (0,0, freq1) | gPxyH (0,0, freq2) | gPxyH (0,0, freq3) | gPxyH (0,0, freq4) | gPxyH (0,0, freq5) | gPxyH (0,0, freq6) | gPxyH (0,0, freq7) | gPxyH (0,0, freq8) | gPxyH (0,0, freq9) |
| (x1,0) | gPxyH (x1,0, freq0) | gPxyH (x1,0, freq1) | gPxyH (x1,0, freq2) | gPxyH (x1,0, freq3) | gPxyH (x1,0, freq4) | gPxyH (x1,0, freq5) | gPxyH (x1,0, freq6) | gPxyH (x1,0, freq7) | gPxyH (x1,0, freq8) | gPxyH (x1,0, freq9) |
| (x2,0) | gPxyH (x2,0, freq0) | gPxyH (x2,0, freq1) | gPxyH (x2,0, freq2) | gPxyH (x2,0, freq3) | gPxyH (x2,0, freq4) | gPxyH (x2,0, freq5) | gPxyH (x2,0, freq6) | gPxyH (x2,0, freq7) | gPxyH (x2,0, freq8) | gPxyH (x2,0, freq9) |
| (0,y1) | gPxyH (0,y1, freq0) | gPxyH (0,y1, freq1) | gPxyH (0,y1, freq2) | gPxyH (0,y1, freq3) | gPxyH (0,y1, freq4) | gPxyH (0,y1, freq5) | gPxyH (0,y1, freq6) | gPxyH (0,y1, freq7) | gPxyH (0,y1, freq8) | gPxyH (0,y1, freq9) |
| (0,y2) | gPxyH (0,y2, freq0) | gPxyH (0,y2, freq1) | gPxyH (0,y2, freq2) | gPxyH (0,y2, freq3) | gPxyH (0,y2, freq4) | gPxyH (0,y2, freq5) | gPxyH (0,y2, freq6) | gPxyH (0,y2, freq7) | gPxyH (0,y2, freq8) | gPxyH (0,y2, freq9) |
| (-x1,0) | gPxyH (-x1,0, freq0) | gPxyH (-x1,0, freq1) | gPxyH (-x1,0, freq2) | gPxyH (-x1,0, freq3) | gPxyH (-x1,0, freq4) | gPxyH (-x1,0, freq5) | gPxyH (-x1,0, freq6) | gPxyH (-x1,0, freq7) | gPxyH (-x1,0, freq8) | gPxyH (-x1,0, freq9) |
| (-x2,0) | gPxyH (-x2,0, freq0) | gPxyH (-x2,0, freq1) | gPxyH (-x2,0, freq2) | gPxyH (-x2,0, freq3) | gPxyH (-x2,0, freq4) | gPxyH (-x2,0, freq5) | gPxyH (-x2,0, freq6) | gPxyH (-x2,0, freq7) | gPxyH (-x2,0, freq8) | gPxyH (-x2,0, freq9) |
| (0,-y1) | gPxyH (0,-y1, freq0) | gPxyH (0,-y1, freq1) | gPxyH (0,-y1, freq2) | gPxyH (0,-y1, freq3) | gPxyH (0,-y1, freq4) | gPxyH (0,-y1, freq5) | gPxyH (0,-y1, freq6) | gPxyH (0,-y1, freq7) | gPxyH (0,-y1, freq8) | gPxyH (0,-y1, freq9) |
| (0,-y2) | gPxyH (0,-y2, freq0) | gPxyH (0,-y2, freq1) | gPxyH (0,-y2, freq2) | gPxyH (0,-y2, freq3) | gPxyH (0,-y2, freq4) | gPxyH (0,-y2, freq5) | gPxyH (0,-y2, freq6) | gPxyH (0,-y2, freq7) | gPxyH (0,-y2, freq8) | gPxyH (0,-y2, freq9) |

FIG. 5

COLOR RED, ZOOM(0) = WIDE, FOCUS POSITION: FAR, HORIZONTAL(H)

| FREQUENCY<br>IMAGE<br>HEIGHT | Freq 0<br>(LOW<br>BAND) | Freq 1 | Freq 2 | Freq 3 | Freq 4 | Freq 5 | Freq 6 | Freq 7 | Freq 8 | Freq 9<br>(HIGH<br>BAND) |
|---|---|---|---|---|---|---|---|---|---|---|
| (0,0) | rPxyH (0,0, freq0) | rPxyH (0,0, freq1) | rPxyH (0,0, freq2) | rPxyH (0,0, freq3) | rPxyH (0,0, freq4) | rPxyH (0,0, freq5) | rPxyH (0,0, freq6) | rPxyH (0,0, freq7) | rPxyH (0,0, freq8) | rPxyH (0,0, freq9) |
| (x1,0) | rPxyH (x1,0, freq0) | rPxyH (x1,0, freq1) | rPxyH (x1,0, freq2) | rPxyH (x1,0, freq3) | rPxyH (x1,0, freq4) | rPxyH (x1,0, freq5) | rPxyH (x1,0, freq6) | rPxyH (x1,0, freq7) | rPxyH (x1,0, freq8) | rPxyH (x1,0, freq9) |
| (x2,0) | rPxyH (x2,0, freq0) | rPxyH (x2,0, freq1) | rPxyH (x2,0, freq2) | rPxyH (x2,0, freq3) | rPxyH (x2,0, freq4) | rPxyH (x2,0, freq5) | rPxyH (x2,0, freq6) | rPxyH (x2,0, freq7) | rPxyH (x2,0, freq8) | rPxyH (x2,0, freq9) |
| (0,y1) | rPxyH (0,y1, freq0) | rPxyH (0,y1, freq1) | rPxyH (0,y1, freq2) | rPxyH (0,y1, freq3) | rPxyH (0,y1, freq4) | rPxyH (0,y1, freq5) | rPxyH (0,y1, freq6) | rPxyH (0,y1, freq7) | rPxyH (0,y1, freq8) | rPxyH (0,y1, freq9) |
| (0,y2) | rPxyH (0,y2, freq0) | rPxyH (0,y2, freq1) | rPxyH (0,y2, freq2) | rPxyH (0,y2, freq3) | rPxyH (0,y2, freq4) | rPxyH (0,y2, freq5) | rPxyH (0,y2, freq6) | rPxyH (0,y2, freq7) | rPxyH (0,y2, freq8) | rPxyH (0,y2, freq9) |
| (-x1,0) | rPxyH (-x1,0, freq0) | rPxyH (-x1,0, freq1) | rPxyH (-x1,0, freq2) | rPxyH (-x1,0, freq3) | rPxyH (-x1,0, freq4) | rPxyH (-x1,0, freq5) | rPxyH (-x1,0, freq6) | rPxyH (-x1,0, freq7) | rPxyH (-x1,0, freq8) | rPxyH (-x1,0, freq9) |
| (-x2,0) | rPxyH (-x2,0, freq0) | rPxyH (-x2,0, freq1) | rPxyH (-x2,0, freq2) | rPxyH (-x2,0, freq3) | rPxyH (-x2,0, freq4) | rPxyH (-x2,0, freq5) | rPxyH (-x2,0, freq6) | rPxyH (-x2,0, freq7) | rPxyH (-x2,0, freq8) | rPxyH (-x2,0, freq9) |
| (0,-y1) | rPxyH (0,-y1, freq0) | rPxyH (0,-y1, freq1) | rPxyH (0,-y1, freq2) | rPxyH (0,-y1, freq3) | rPxyH (0,-y1, freq4) | rPxyH (0,-y1, freq5) | rPxyH (0,-y1, freq6) | rPxyH (0,-y1, freq7) | rPxyH (0,-y1, freq8) | rPxyH (0,-y1, freq9) |
| (0,-y2) | rPxyH (0,-y2, freq0) | rPxyH (0,-y2, freq1) | rPxyH (0,-y2, freq2) | rPxyH (0,-y2, freq3) | rPxyH (0,-y2, freq4) | rPxyH (0,-y2, freq5) | rPxyH (0,-y2, freq6) | rPxyH (0,-y2, freq7) | rPxyH (0,-y2, freq8) | rPxyH (0,-y2, freq9) |

FIG. 6

COLOR BLUE, ZOOM(0)=WIDE, FOCUS POSITION:FAR, HORIZONTAL(H)

| FREQUENCY IMAGE HEIGHT | Freq 0 (LOW BAND) | Freq 1 | Freq 2 | Freq 3 | Freq 4 | Freq 5 | Freq 6 | Freq 7 | Freq 8 | Freq 9 (HIGH BAND) |
|---|---|---|---|---|---|---|---|---|---|---|
| (0,0) | bPxyH (0,0, freq0) | bPxyH (0,0, freq1) | bPxyH (0,0, freq2) | bPxyH (0,0, freq3) | bPxyH (0,0, freq4) | bPxyH (0,0, freq5) | bPxyH (0,0, freq6) | bPxyH (0,0, freq7) | bPxyH (0,0, freq8) | bPxyH (0,0, freq9) |
| (x1,0) | bPxyH (x1,0, freq0) | bPxyH (x1,0, freq1) | bPxyH (x1,0, freq2) | bPxyH (x1,0, freq3) | bPxyH (x1,0, freq4) | bPxyH (x1,0, freq5) | bPxyH (x1,0, freq6) | bPxyH (x1,0, freq7) | bPxyH (x1,0, freq8) | bPxyH (x1,0, freq9) |
| (x2,0) | bPxyH (x2,0, freq0) | bPxyH (x2,0, freq1) | bPxyH (x2,0, freq2) | bPxyH (x2,0, freq3) | bPxyH (x2,0, freq4) | bPxyH (x2,0, freq5) | bPxyH (x2,0, freq6) | bPxyH (x2,0, freq7) | bPxyH (x2,0, freq8) | bPxyH (x2,0, freq9) |
| (0,y1) | bPxyH (0,y1, freq0) | bPxyH (0,y1, freq1) | bPxyH (0,y1, freq2) | bPxyH (0,y1, freq3) | bPxyH (0,y1, freq4) | bPxyH (0,y1, freq5) | bPxyH (0,y1, freq6) | bPxyH (0,y1, freq7) | bPxyH (0,y1, freq8) | bPxyH (0,y1, freq9) |
| (0,y2) | bPxyH (0,y2, freq0) | bPxyH (0,y2, freq1) | bPxyH (0,y2, freq2) | bPxyH (0,y2, freq3) | bPxyH (0,y2, freq4) | bPxyH (0,y2, freq5) | bPxyH (0,y2, freq6) | bPxyH (0,y2, freq7) | bPxyH (0,y2, freq8) | bPxyH (0,y2, freq9) |
| (-x1,0) | bPxyH (-x1,0, freq0) | bPxyH (-x1,0, freq1) | bPxyH (-x1,0, freq2) | bPxyH (-x1,0, freq3) | bPxyH (-x1,0, freq4) | bPxyH (-x1,0, freq5) | bPxyH (-x1,0, freq6) | bPxyH (-x1,0, freq7) | bPxyH (-x1,0, freq8) | bPxyH (-x1,0, freq9) |
| (-x2,0) | bPxyH (-x2,0, freq0) | bPxyH (-x2,0, freq1) | bPxyH (-x2,0, freq2) | bPxyH (-x2,0, freq3) | bPxyH (-x2,0, freq4) | bPxyH (-x2,0, freq5) | bPxyH (-x2,0, freq6) | bPxyH (-x2,0, freq7) | bPxyH (-x2,0, freq8) | bPxyH (-x2,0, freq9) |
| (0,-y1) | bPxyH (0,-y1, freq0) | bPxyH (0,-y1, freq1) | bPxyH (0,-y1, freq2) | bPxyH (0,-y1, freq3) | bPxyH (0,-y1, freq4) | bPxyH (0,-y1, freq5) | bPxyH (0,-y1, freq6) | bPxyH (0,-y1, freq7) | bPxyH (0,-y1, freq8) | bPxyH (0,-y1, freq9) |
| (0,-y2) | bPxyH (0,-y2, freq0) | bPxyH (0,-y2, freq1) | bPxyH (0,-y2, freq2) | bPxyH (0,-y2, freq3) | bPxyH (0,-y2, freq4) | bPxyH (0,-y2, freq5) | bPxyH (0,-y2, freq6) | bPxyH (0,-y2, freq7) | bPxyH (0,-y2, freq8) | bPxyH (0,-y2, freq9) |

FOCUS CONTROL APPARATUS, IMAGE CAPTURING APPARATUS, INTERCHANGEABLE LENS, FOCUS CONTROL METHOD, AND STORAGE MEDIUM STORING FOCUS CONTROL PROGRAM

BACKGROUND OF THE INVENTION

Field of the Invention

The present invention relates to a focus control apparatus that performs focus control of an interchangeable lens attached to a lens-interchangeable image capturing apparatus.

Description of the Related Art

Lens-interchangeable image capturing apparatuses such as digital cameras are each provided with a focus control apparatus that performs focus control (autofocus: AF) of an interchangeable lens attached thereto. Such image capturing apparatuses may be affected in an accuracy of the focus control, in other words, an in-focus accuracy by aberrations unique to the interchangeable lens.

Japanese Patent Laid-open No. 2004-347665 discloses an image capturing apparatus that detects an in-focus position by using a signal obtained by extracting a high frequency component of an object image and corrects the in-focus position depending on color information of the object image and on a chromatic aberration property of a focus lens, thereby achieving an improved in-focus accuracy. Japanese Patent Laid-open No. 2006-135513 discloses an image capturing apparatus that corrects a focus detection result by using a correction amount calculated from, for example, a spectrum intensity distribution of an object image and using information on focal points at respective wavelengths (in other words, on chromatic aberration) of an interchangeable lens, thereby achieving an improved in-focus accuracy.

These image capturing apparatuses disclosed in Japanese Patent Laid-open Nos. 2004-347665 and 2006-135513 can improve the in-focus accuracy by performing the correction relating to the chromatic aberration of the interchangeable lens, but cannot reflect an individual difference of the interchangeable lens from other lenses due to, for example, a manufacturing error onto its in-focus accuracy.

SUMMARY OF THE INVENTION

The present invention provides a focus control apparatus and an image capturing apparatus that are each capable of performing focus control reflecting an individual difference of an interchangeable lens which is likely to affect an in-focus accuracy, and performing a fast focus control with a sufficient accuracy for an interchangeable lens having a negligible individual difference.

The present invention provides as an aspect thereof a focus control apparatus to be provided to an image capturing apparatus to which an interchangeable lens is detachably attachable, the image capturing apparatus being configured to capture an object image formed by the interchangeable lens. The focus control apparatus includes a focus detector configured to detect a focus state of the interchangeable lens, and a controller configured to perform focus control of the interchangeable lens by using information obtained through the detection of the focus state and a correction value corresponding to the interchangeable lens. A first interchangeable lens and a second interchangeable lens, each of which is the interchangeable lens, are attachable to the image capturing apparatus, the first interchangeable lens holding correction value calculation data that is used to calculate the correction value and is unique to the first interchangeable lens, the second interchangeable lens not holding the correction value calculation data. The focus control apparatus includes a first memory storing values for calculating the correction value corresponding to the second interchangeable lens. The controller is configured to perform; when the second interchangeable lens is attached to the image capturing apparatus, the focus control by using the correction value calculated based on the values read from the first memory; and calculate, when the first interchangeable lens is attached to the image capturing apparatus, the correction value by using the correction value calculation data acquired from the first interchangeable lens and then perform the focus control by using the calculated correction value.

The present invention provides as another aspect thereof an image capturing apparatus to which an interchangeable lens is detachably attachable. The image capturing apparatus includes the above focus control apparatus, and an image sensor configured to capture an object image formed by the interchangeable lens to convert the object image into an electric signal.

The present invention provides as yet another aspect thereof an interchangeable lens detachably attachable to the above image capturing apparatus. The interchangeable lens includes a lens memory storing correction value calculation data that is used to calculate the correction value and is unique to the interchangeable lens, and a communicator configured to send the correction value calculation data to the image capturing apparatus.

The present invention provides as still another aspect thereof a focus control method to be used for an image capturing apparatus to which an interchangeable lens is detachably attachable and which is configured to capture an object image formed by the interchangeable lens. The method includes a detection step of detecting a focus state of the interchangeable lens, and a control step of performing focus control of the interchangeable lens by using information obtained through the detection of the focus state and a correction value corresponding to the interchangeable lens. A first interchangeable lens and a second interchangeable lens, each of which is the interchangeable lens, are attachable to the image capturing apparatus, the first interchangeable lens holding correction value calculation data that is used to calculate the correction value and is unique to the first interchangeable lens, the second interchangeable lens not holding the correction value calculation data. In the controlling step, the method performs, when the second interchangeable lens is attached to the image capturing apparatus, the focus control by using the correction value calculated based on values read from a first memory included in the image capturing apparatus, and the method calculates, when the first interchangeable lens is attached to the image capturing apparatus, the correction value by using the correction value calculation data acquired from the first interchangeable lens and then performs the focus control by using the calculated correction value.

The present invention provides as further another aspect thereof a non-transitory computer-readable storage medium that stores a focus control program as a computer program for causing a computer of an image capturing apparatus, to which an interchangeable lens is detachably attachable to perform an operation according to the above focus control method.

Further features and aspects of the present invention will become apparent from the following description of exemplary embodiments with reference to the attached drawings.

BRIEF DESCRIPTION OF THE DRAWINGS

FIGS. 4A to 4C are explanatory diagrams of a data structure of correction value calculation data for calculating BF correction values set for a designed value.

FIG. 5 is an explanatory diagram of a data structure of correction value calculation data (for Green) for calculating BF correction values set for a manufacturing error.

FIG. 6 is an explanatory diagram of a data structure of correction value calculation data (for red) for calculating BF correction values set for the manufacturing error.

FIG. 7 is an explanatory diagram of a data structure of correction value calculation data (for blue) for calculating BF correction values set for the manufacturing error.

FIG. 9 is an explanatory diagram of a phase difference AF pixel in an image sensor of the camera of Embodiment 1.

DESCRIPTION OF THE EMBODIMENTS

Exemplary embodiments of the present invention will be described below with reference to the accompanied drawings.

[Embodiment 1]

Figure 1:
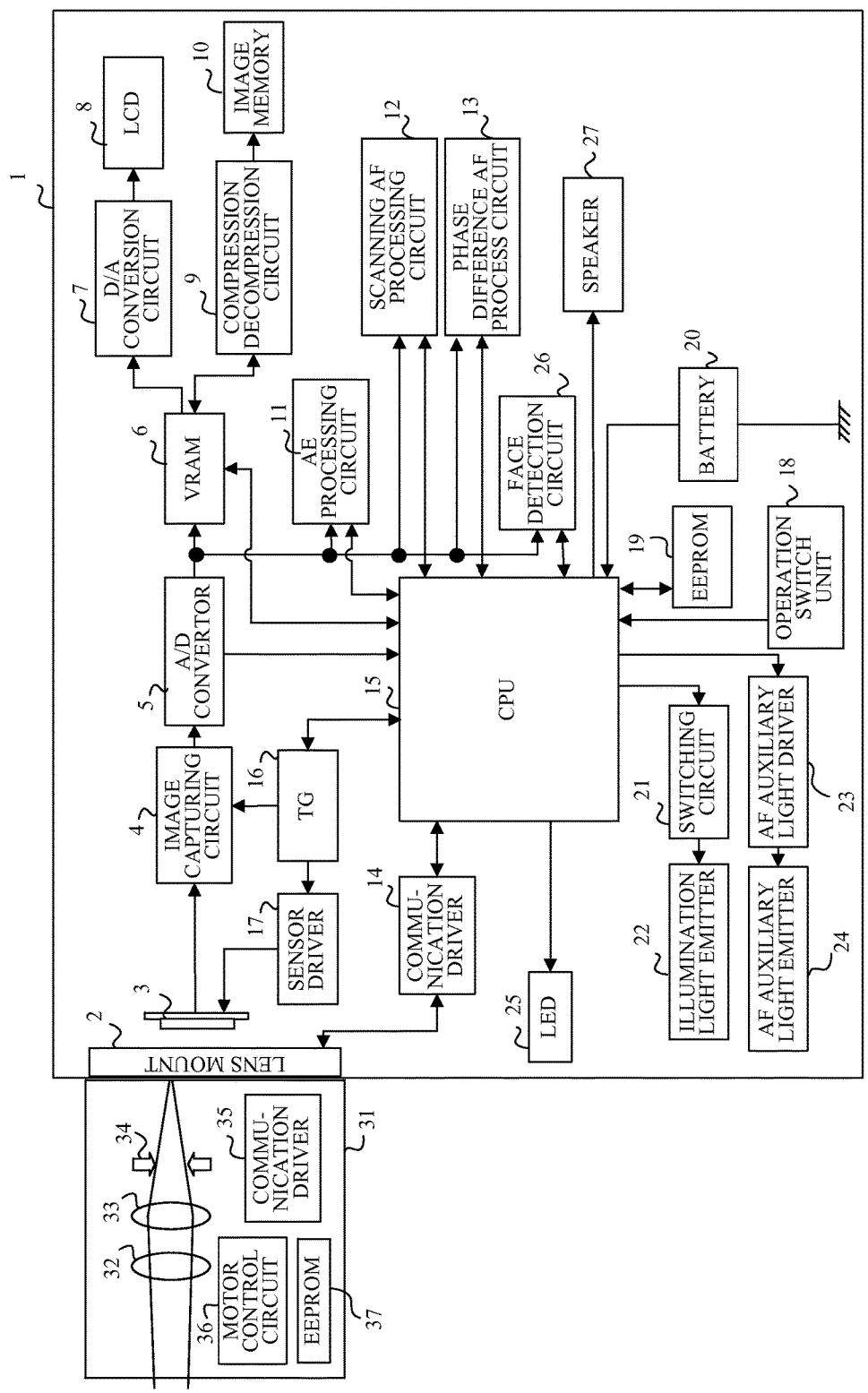
FIG. 1 is a block diagram showing a configuration of a camera that is Embodiment 1 of the present invention.

FIG. 1 illustrates a configuration of a digital camera (hereinafter simply referred to as "a camera") 1 as an image capturing apparatus that is a first embodiment of the present invention. An interchangeable lens 31 is detachably attached to a lens mount 2 of the camera 1.

In the camera 1, reference numeral 3 denotes a solid image sensor (hereinafter simply referred to as "an image sensor) 2 that converts an object image formed by an image capturing optical system in the interchangeable lens 31 into an electric signal. Reference numeral 4 denotes an image capturing circuit that performs various kinds of signal processes on the electric signal output from the image sensor 3 to produce an analog image signal. Reference numeral 5 denotes an A/D convertor that converts the analog image signal produced by the image capturing circuit 4 into a digital image signal. Reference numeral 6 denotes a VRAM such as a buffer memory that temporarily stores the digital image signal output from the A/D convertor 5. Reference numeral 7 denotes a D/A convertor that reads the digital image signal stored in the VRAM 6 and performs an analog conversion on the signal to convert the signal into a display image signal in a format appropriate for display. Reference numeral 8 denotes an image display unit (hereinafter referred to as "an LCD") including, for example, a liquid crystal display element that displays the display image signal from the D/A convertor 7 as a live-view image.

Reference numeral 10 denotes an image memory such as a semiconductor memory which stores image data. Reference numeral 9 denotes a compression decompression circuit that reads the image signal temporarily stored in the VRAM 6 and performs a compression process and an encoding process for converting the read image signal into record image data in a format appropriate for storage in the image memory 10. The compression decompression circuit 9 also performs a decoding process and a decompression process for converting the record image data stored in the image memory 10 into a playback image signal in a format appropriate for playback display. The image memory 10 may be not only a built-in semiconductor memory but also other various storage media such as a card or stick semiconductor memory, an optical disk and a hard disk each of which is detachably attachable to the camera 1.

Reference numeral 11 denotes an automatic exposure (AE) process circuit that performs an AE process by using the digital image signal output from the A/D convertor 5. Reference numeral 12 denotes a scanning AF process circuit that produces an AF evaluation value to be used in a scanning AF (contrast AF) process by using the digital image signal output from the A/D convertor 5. Reference numeral 13 denotes a phase difference AF process circuit that produces a base signal (A-image signal described later) and a reference signal (B-image signal described later) for performing a phase difference AF process using the digital image signal output from the A/D convertor 5 and performs a correlation calculation for the A- and B-images.

Reference numeral 14 denotes a communication driver for communicating with the interchangeable lens 31. Reference numeral 15 denotes a CPU that serves as a controller and performs control of the entire camera 1 and includes a built-in memory for calculation. The CPU 15 together with the scanning AF process circuit 12 and the phase difference AF process circuit 13 are included in a focus detector.

Reference numeral 16 denotes a timing generator (hereinafter, referred to as "a TG") that produces timing signals, and reference numeral 17 denotes a sensor driver that drives the image sensor 3.

Reference numeral 18 denotes an operation switch unit that includes a main switch for turning power of the camera 1 on and off, a release switch for starting the AE and AF processes and an image capturing (recording) process, and a playback switch for starting a playback operation of a captured image. The release switch is a two stroke switch constituted by a first stroke switch (hereinafter referred to as "an SW1") for producing an instruction signal for starting the AE and AF processes and a second stroke switch (hereinafter referred to as "an SW2") for producing an instruction signal for starting the image capturing process.

Reference numeral 19 denotes a camera EEPROM which serves as a first memory and a second memory and stores computer programs for various controls and data for various operations in a rewritable manner. Reference numeral 20 denotes a battery.

Reference numeral 22 denotes an illumination light emitter. Reference numeral 21 denotes a switching circuit that controls flash light emission of the illumination light emitter 22. Reference numeral 24 denotes an AF auxiliary light emitter including a light source such as an LED. Reference numeral 23 denotes an AF auxiliary light driver that drives the AF auxiliary light emitter 24. Reference numeral 25 denotes a display element including an LED for displaying a warning message and others. Reference numeral 26 denotes a face detector that detects, for example, a position and a size of a person's face based on the digital image signal from the A/D convertor 5. Reference numeral 27 denotes a speaker for outputting guidance sound, warning sound and others.

In the interchangeable lens 31, reference numeral 32 denotes a zoom lens, 33 a focus lens and 34 an aperture stop.

The zoom lens 32, the focus lens 33, the aperture stop 34 and other lenses not illustrated constitute the image capturing optical system.

Reference numeral 35 denotes a communication driver (communicator) communicating with the camera 1. Reference numeral 36 denotes a motor control circuit that controls an aperture stop drive motor (not illustrated) for driving the aperture stop 34, a focus drive motor (not illustrated) for driving the focus lens 33 and a zoom drive motor (not illustrated) for driving the zoom lens 32. Reference numeral 37 denotes a lens EEPROM (lens memory) that stores data to be used for various controls and operations in a rewritable manner.

Next, description will be made of operations of the camera 1 and the interchangeable lens 31 configured as described above. A light flux from an object enters the image capturing optical system of the interchangeable lens 31; the image capturing optical system causes the light flux to form an object image. The image sensor 3 photoelectrically converts the object image formed on its light-receiving surface into an electric signal and outputs the electric signal to the image capturing circuit 4. The image capturing circuit 4 performs various kinds of signal processes on the input electric signal and produces an analog image signal. The A/D convertor 5 converts the analog image signal into a digital image signal and then temporarily stores the image signal in the VRAM 6. The image signal stored in the VRAM 6 is output to the D/A convertor 7 and is converted thereby into an analog image signal and then into a display image signal to be displayed as the live-view image on the LCD 8.

The image signal stored in the VRAM 6 is also output to the compression decompression circuit 9. The compression decompression circuit 9 converts the image signal into the record image data through the compression and encoding processes to store the record image data in the image memory 10. When the playback switch provided to the operation switch unit 18 is turned on, the record image data stored in a compressed state in the image memory 10 is output to the compression decompression circuit 9. The record image data is subjected to the decoding and decompression processes in the compression decompression circuit 9 to be output as the digital image signal to the VRAM 6 where the image signal is temporarily stored. Subsequently, the image data is output to the D/A conversion circuit 7 to be converted into the playback image signal and is then displayed as a playback image by the LCD 8.

The digital image signal from the A/D convertor 5 is output not only to the VRAM 6 but also to the AE process circuit 11, the scanning AF process circuit 12 and the phase difference AF process circuit 13. The AE process circuit 11 extracts a luminance component from the input digital image signal to perform a cumulative addition for one frame and performs the AE process for producing an AE evaluation value signal representing brightness of the object. The AE evaluation value signal is output to the CPU 15.

The scanning AF process circuit 12 extracts a high frequency component of the input digital image signal in a selected AF area through a high-pass filter (HPF) to perform a cumulative addition for one frame to produce an AF evaluation value signal representing a contrast of the object image in the AF area. Since the contrast of the object image corresponds to a focus state of the image capturing optical system, the production of the AF evaluation value signal is equivalent to detection of the focus state. Thus, the AF evaluation value signal (or the AF evaluation value as a value thereof) is information obtained through the detection of the focus state of the image capturing optical system. The AF area may be an area in a central part of an entire image capturing frame, or may be multiple areas including the area in the central part and its surrounding areas.

The scanning AF process circuit 12 includes a low-pass filter (LPF) before the HPF; the LPF cancels a noise component generated by the image sensor 3 and subsequent circuits. Thus, the scanning AF process circuit 12 is in reality configured as a band-pass filter (BPF) that produces the AF evaluation value signal.

The phase difference AF process circuit 13 extracts, from the input digital image signal, the A-image signal and the B-image signal as paired phase difference image signals respectively corresponding to an A-image and a B-image as paired object images included in the AF area. Then, the phase difference AF process circuit 13 performs a correlation calculation on the A- and B-image signals to calculate a shift amount (phase difference) between the A- and B-image signals. The CPU 15 calculates (detects) a defocus amount of the image capturing optical system from the calculated shift amount of the A- and B-image signals. The defocus amount is information obtained through the detection of the focus state of the image capturing optical system.

On the image sensor 3, in addition to pixels for image capturing, multiple paired pixels for the phase difference AF (each of the pixels is hereinafter referred to as "a phase difference AF pixel") that receive light fluxes from mutually different areas of an exit pupil of the image capturing optical system are arranged. The A-image signal is produced through photoelectric conversion of the A-image by ones of the multiple paired phase difference AF pixels included in the AF area, and the B-image signal is produced through photoelectric conversion of the B-image by other ones of the multiple paired phase difference AF pixels included therein. Each of all pixels on the image sensor 3 may be provided with a microlens and paired light-receiving elements to produce the A-image signal by ones of the paired light-receiving elements of multiple pixels included in the AF area and to produce the B-image signal by other ones of the paired light-receiving elements.

The timing signal from the TG 16 is output to the CPU 15, the image capturing circuit 4 and the sensor driver 17. The CPU 15 performs various controls in synchronization with the timing signal. The image capturing circuit 4 performs various signal processes such as a color separation process on the image signal from the image sensor 3 in synchronization with the timing signal. The sensor driver 17 drives the image sensor 3 in synchronization with the timing signal.

The CPU 15 controls the aperture stop 34 and the focus lens 33 by communicating with the interchangeable lens 31 through the communication driver 14. Specifically, the CPU 15 transmits an aperture stop control signal for controlling an aperture value based on a value (AE evaluation value) of the AE evaluation value signal produced by the AE process circuit 11 to the motor control circuit 36 of the interchangeable lens 31. The motor control circuit 36 controls the aperture stop drive motor so that the aperture stop 34 is set to an aperture value in accordance with the aperture stop control signal. Furthermore, the CPU 15 sends a focus control signal for moving the focus lens 33, based on the value (AF evaluation value) of the AF evaluation value signal produced by the scanning AF process circuit 12 or based on the defocus amount calculated by the phase difference AF process circuit 13, to the motor control circuit 36. The motor control circuit 36 controls the focus drive motor so that the focus lens 33 is moved to a position (in-focus position) at which the AF evaluation value becomes maximum, or to a position range (in-focus range) in which the defocus amount is smaller than or equal to a predetermined value. The process from the production of the AF evaluation value to the outputting of the focus control signal (movement of the focus lens 33) is referred to as "a scanning AF process", and the process from the calculation of the defocus amount to the outputting of the focus control signal (movement of the focus lens 33) is referred to as "the phase difference AF process".

The interchangeable lens 31 attachable to the camera 1 includes a first interchangeable lens requiring correction of a position that is obtained by the scanning AF process circuit 12 and at which the AF evaluation value becomes maximum; the correction depends on its individual difference due to its manufacturing error. The interchangeable lens 31 further includes a second interchangeable lens not requiring the correction depending on the individual difference due to the manufacturing error but requiring correction depending on its designed value. The first interchangeable lens causes the CPU 15 of the camera 1 to calculate a best focus correction value (hereinafter referred to as "a BF correction value") to be used for the correction depending on the individual difference due to the manufacturing error. For this purpose, the first interchangeable lens holds data of design parameters of the first interchangeable lens (that is, of the image capturing optical system) and data of manufacturing-error parameters measured at manufacturing thereof (in other words, unique correction value calculation data) in the lens EEPROM 37. On the other hand, the second interchangeable lens does not hold data of manufacturing-error parameters in the lens EEPROM 37. However, some interchangeable lenses of multiple types as the second interchangeable lenses hold data of design parameters of the interchangeable lenses (image capturing optical systems) in the lens EEPROM 37. The camera 1 previously holds BF correction values for other interchangeable lenses of the multiple types as the second interchangeable lenses. Correction value data and correction value calculation data have data structures different from each other.

Figure 2A:
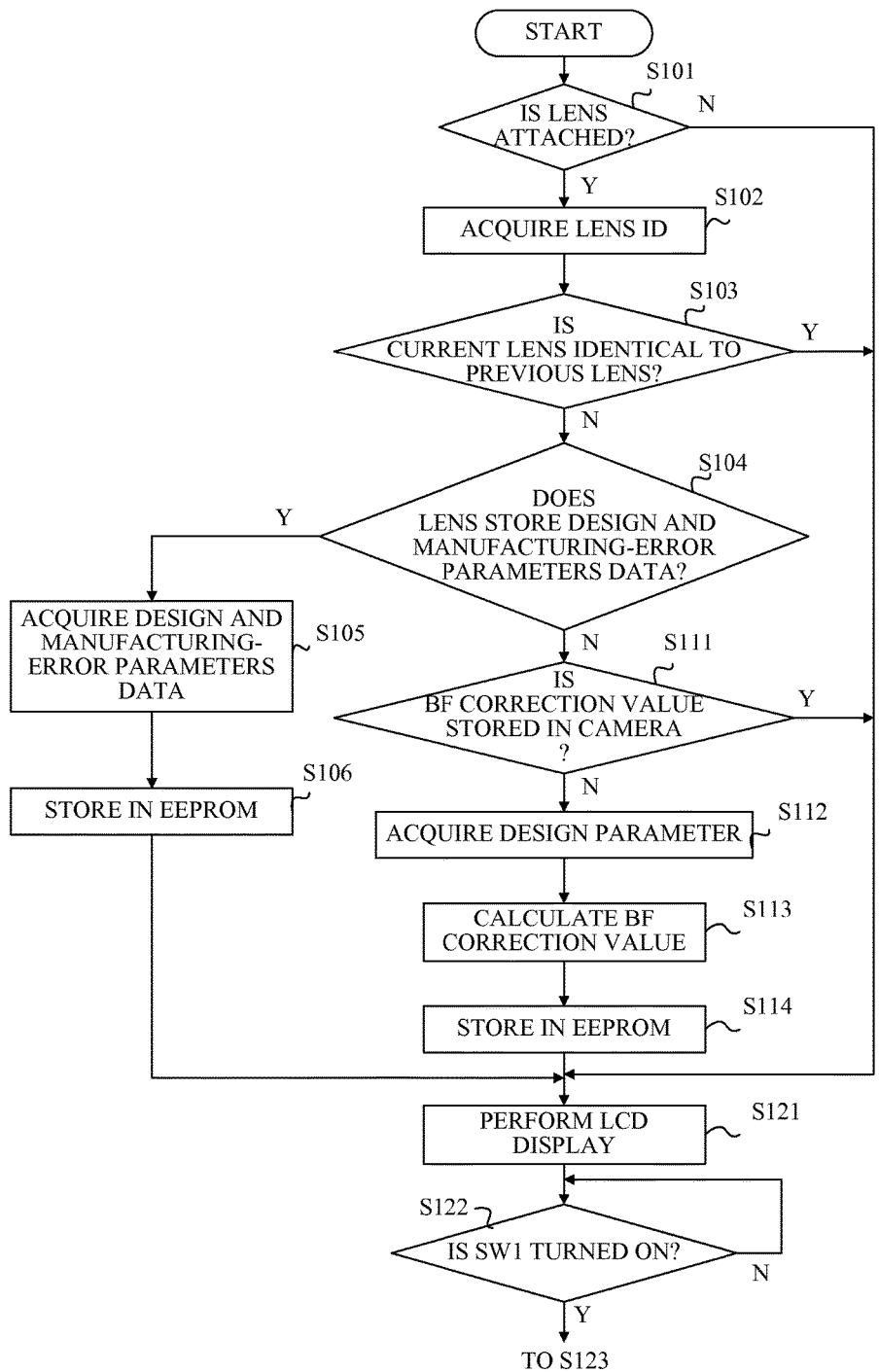
FIGS. 2A and 2B are flowcharts of an image capturing operation of the camera of Embodiment 1.
Figure 2B:
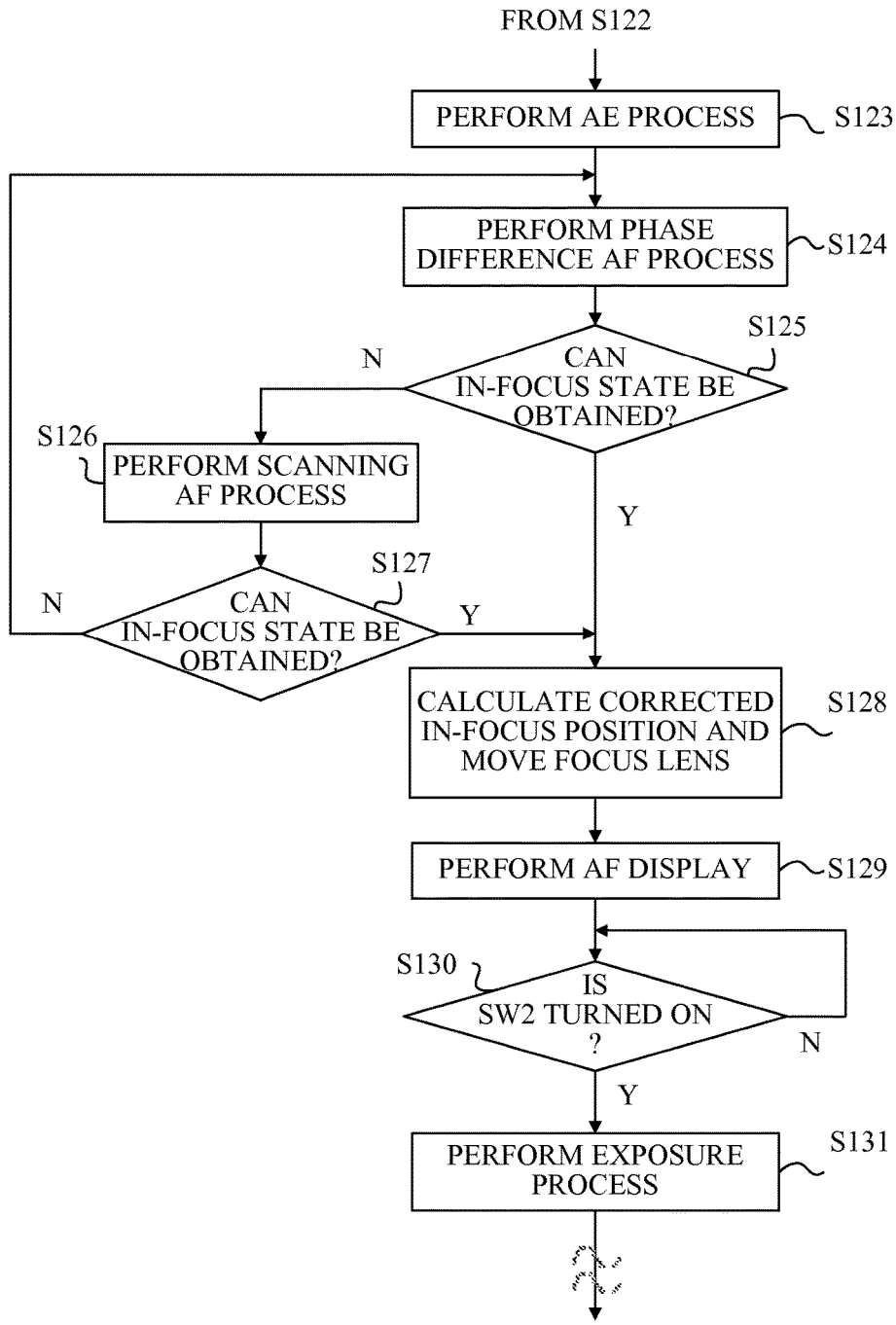

Next, description will be made of an image capturing operation performed by the camera 1 of this embodiment with reference to flowcharts illustrated in FIGS. 2A to 2B. This image capturing operation (image capturing process sequence) is executed by the CPU 15 as a computer according to a computer program including a focus control program. Hereinafter, an operation of acquiring the AF evaluation value while sequentially moving the focus lens 33 to multiple AF evaluation value acquisition positions is referred to as "scanning", and an interval of the AF evaluation value acquisition positions is referred to as "a scanning interval". The number of the AF evaluation value acquisition positions is referred to as "a scanning point number", and a movable range of the focus lens 33 including the AF evaluation value acquisition positions in the scanning point number is referred to as "a scanning range". As described above, an area of the image capturing frame in which the A- and B-image signals are extracted from the image signal and the AF evaluation value signal is produced (the AF evaluation value is acquired) is referred to as "the AF area".

When the main switch of the camera 1 is turned on and an operation mode of the camera 1 is an image capturing (recording) mode, the image capturing process sequence starts up.

First, at step S101, the CPU 15 determines whether the interchangeable lens 31 is attached to the camera 1. If the interchangeable lens 31 is attached, the CPU 15 proceeds to step S102 to perform a process relating to acquisition of the BF correction value. If the interchangeable lens 31 is not attached, the CPU 15 proceeds to step S121.

At step S102, the CPU 15 acquires a lens ID as identification information of the attached interchangeable lens 31 through communication with the interchangeable lens 31.

Next, at step S103, the CPU 15 determines, by using the lens ID, whether the currently attached interchangeable lens 31 is identical to that previously attached to the camera 1. If the currently attached interchangeable lens 31 is identical to the previously attached interchangeable lens, the CPU 15 proceeds to step S121. If the currently attached interchangeable lens 31 is not identical to the previously attached interchangeable lens, the CPU 15 proceeds to step S104.

At step S104, the CPU 15 determines whether the currently attached interchangeable lens 31 holds the data of manufacturing-error parameters for performing correction depending on its individual difference due to its manufacturing error. If the currently attached interchangeable lens 31 holds the data of the manufacturing-error parameters (in other words, if the currently attached interchangeable lens 31 is the first interchangeable lens), the CPU 15 proceeds to step S105. If the currently attached interchangeable lens 31 does not hold the data of manufacturing-error parameters (in other words, if the currently attached interchangeable lens 31 is the second interchangeable lens), the CPU 15 proceeds to step S111.

At step S105, the CPU 15 acquires the data of design parameters and the data of manufacturing-error parameters from the first interchangeable lens (lens EEPROM 37) through communication with the attached first interchangeable lens. At step S106, the CPU 15 stores the data in the camera EEPROM 19. Then, the CPU 15 proceeds to step S121. Alternatively, at step S105, the CPU 15 may acquire only the data of design parameters from the first interchangeable lens and acquire the data of manufacturing-error parameters later when performing the AF process. This can achieve a reduced amount of communication with the first interchangeable lens at the startup of the camera 1 and a reduced time needed for the startup.

On the other hand, at step S111, the CPU 15 determines whether the BF correction value for the attached second interchangeable lens is stored in the camera EEPROM 19. If the BF correction value is stored, the CPU 15 proceeds to step S121. If the BF correction value is not stored, the CPU 15 proceeds to step S112.

At step S112, the CPU 15 acquires the data of design parameters from the second interchangeable lens (lens EEPROM 37) through communication with the second interchangeable lens.

Next, at step S113, the CPU 15 calculates the BF correction values for each image height, each focal length, each object distance (each position of the focus lens 33) and each aperture value by using the design parameters and stores the calculated BF correction values in the camera EEPROM 19. In this manner, in this embodiment, the camera EEPROM 19 stores not the acquired data of design parameters, but the BF correction values calculated from that data. Then, the CPU 15 proceeds to step S121.

When the camera EEPROM 19 already stores a large amount of the BF correction values for a lot of the second interchangeable lenses, a BF correction value for a new second interchangeable lens may not be able to be stored due to a storage capacity of the camera EEPROM 19. In such a case, an attachment history (date and time, for example) of the second interchangeable lenses may be checked by using the lens IDs thereof to remove the BF correction value for at least one second interchangeable lens having an oldest attachment history or a lowest attachment frequency from the camera EEPROM 19 so that the BF correction value for the new second interchangeable lens can be stored. Since BF correction values are provided for respective focal lengths, the storage capacity needed to store the BF correction values differs depending on a zoom magnification of the new second interchangeable lens. Thus, depending on the storage capacity needed to store the BF correction values for the new second interchangeable lens, BF correction values for multiple second interchangeable lenses may be removed from the camera EEPROM 19.

At step S121, the CPU 15 starts display of a live-view image on the LCD 8.

Next, at step S122, the CPU 15 determines whether the SW1 of the release switch is turned on. If the SW1 is turned on, the CPU 15 proceeds to step S123. If the SW1 is not turned on, the CPU 15 repeats the determination at the present step S122.

At step S123, the CPU 15 causes the AE process circuit 11 to perform the AE process for image capturing. This sets the aperture value at image capturing and a charge accumulation time (shutter speed) of the image sensor 3.

Next, at step S124, the CPU 15 performs the phase difference AF process. Specifically, the CPU 15 causes the phase difference AF process circuit 13 to calculate the shift amount of the A- and B-image signals extracted from the image signal acquired from the AF area before the SW1 is turned on, and calculates the defocus amount from the shift amount. Then, the CPU 15 moves the focus lens 33 depending on the defocus amount. The phase difference AF process will be described later in detail.

Next, at step S125, the CPU 15 determines whether the defocus amount calculated after the focus lens 33 is moved by the phase difference AF process is smaller than or equal to the above-mentioned predetermined value. In other words, the CPU 15 determines whether the focus state is in the in-focus range. This determination is performed when the calculated defocus amount is reliable. Specifically, when the A- and B-image signals used to calculate the defocus amount have signal levels higher than or equal to a predetermined level, a degree of similarity between the A- and B-image signals is high and the calculated defocus amount is smaller than or equal to the above-mentioned predetermined value, the CPU 15 determines that an in-focus state can be obtained by the phase difference AF process. If the in-focus state can be obtained by the phase difference AF process, the CPU 15 proceeds to step S128. If the in-focus state cannot be obtained by the phase difference AF process, the CPU 15 proceeds to step S126.

At step S126, the CPU 15 performs the scanning AF process in the AF area.

Then, at step S127, the CPU 15 determines whether an in-focus state can be obtained by the scanning AF process. If the in-focus state can be obtained by the scanning AF process, the CPU 15 proceeds to step S128. If the in-focus state cannot be obtained by the scanning AF process, the CPU 15 returns to step S124 and performs the phase difference AF process again.

In the series of the processes for AF at steps S124 to S127, the phase difference AF process and the scanning AF process are alternately performed until the in-focus state is obtained by one of these AF processes, instead of being independently completed. First at step S126, a drive mode of the image sensor 3 (sensor drive mode) is switched to a mode for the scanning AF process. When the scanning AF process is not performed, a slow sensor drive mode for driving the image sensor 3 at a relatively slow frame rate is used for lowering of power consumption and others. On the other hand, when the scanning AF process is performed, the sensor drive mode is switched to a fast sensor drive mode for driving the image sensor 3 at a fastest frame rate achievable by the image sensor 3 to speed up the process. The switching to the fast sensor drive mode is performed only once when the scanning AF process is first performed and is not performed when the scanning AF process is subsequently performed. When the series of the processes for AF are finished, the sensor drive mode is switched back to the slow sensor drive mode at a timing of, for example, AF display at step S129.

Figure 3:
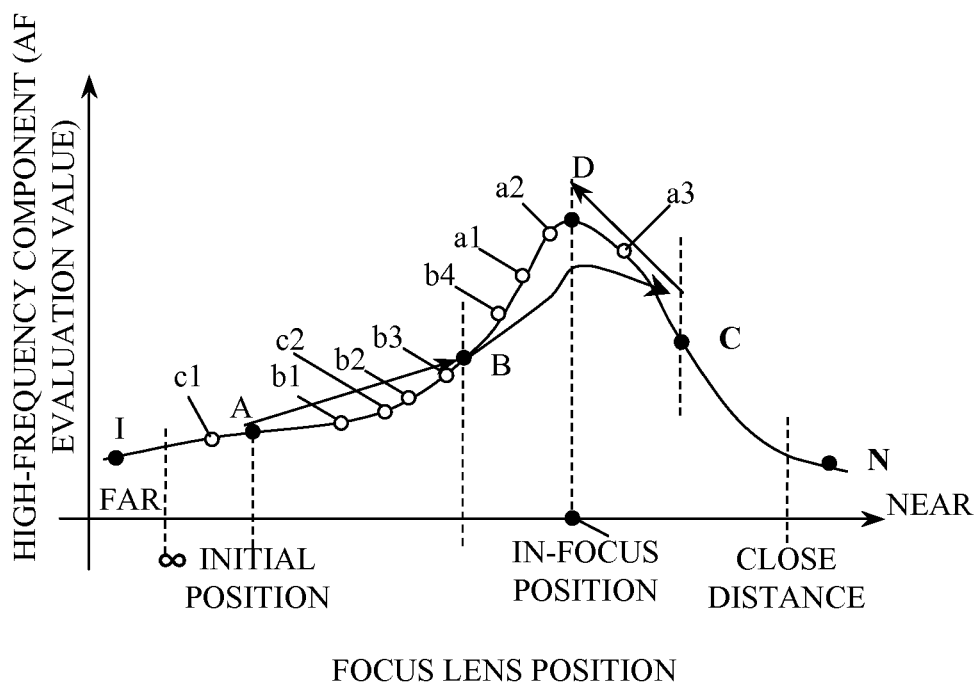
FIG. 3 is an explanatory diagram of scanning AF process of the camera of Embodiment 1.

The series of the processes for AF will be described with reference to FIG. 3. As a result of the phase difference AF process at step S124, the CPU 15 first moves the focus lens 33 to an initial position A to start the scanning in the scanning AF process. Then at step S125, the CPU 15 determines whether the in-focus state can be obtained by the phase difference AF process. When the in-focus state can be obtained, the CPU 15 determines whether the defocus amount is highly reliable and thus it can be estimated that an in-focus position exists near the position of the focus lens 33 after moved by a movement amount corresponding to the defocus amount. If the in-focus position can be estimated to be near the position of the focus lens 33, which is referred to as "case 1", the CPU 15 moves, at step S126, the focus lens 33 from the position A to a position B closer to the in-focus position by a predetermined amount.

Then, at step S127, the CPU 15 determines whether the in-focus state can be obtained though the scanning AF process. If the in-focus state can be obtained, the CPU 15 proceeds to step S128. However, at this stage the scanning AF process is not started in effective, and thus the CPU 15 determines that the in-focus state cannot be obtained and returns to step S124.

At step S124, the CPU 15 performs the phase difference AF process by using the A- and B-image signals extracted from the image signal obtained at the position B (the A- and B-image signals are hereinafter referred to as "A- and B-image signals obtained at the position B"; the same expression applies to other positions). Since the position B is closer to the in-focus position than the initial position A, the degree of similarity between the A- and B-image signals and the defocus amount are highly likely to satisfy a condition to determine that the in-focus state can be obtained. Thus, the CPU 15 performs the phase difference AF process again at the position B. This phase difference AF process uses the A- and B-image signals obtained by reading from the image sensor 3 driven in the fast sensor drive mode set at step S126. When determining at step S125 as a result of the phase difference AF process that the in-focus state can be obtained, the CPU 15 proceeds to step S128.

On the other hand, if having determined that the in-focus state cannot be obtained, the CPU 15 proceeds to step S126 to perform the scanning AF process again. The scanning AF process starts in effective from this step S126. The CPU 15 stores the AF evaluation value acquired from the image signal obtained at the position B (hereinafter referred to as "an AF evaluation value acquired at the position B; the same expression applies to other positions) as an AF evaluation value acquisition position to the built-in memory of the CPU 15. Then, the CPU 15 moves the focus lens 33 to a next AF evaluation value acquisition position. Then, the CPU 15 returns to step S124.

At step S124, the CPU 15 performs the phase difference AF process again and further determines whether the in-focus state can be obtained by the phase difference AF at step S125. If the in-focus state cannot be obtained, the CPU 15 proceeds to step S126 to perform the scanning AF process. In this manner, the CPU 15 repeats the acquisition of the AF evaluation value and the movement of the focus lens 33 after performing each scanning AF process, thereby detecting a position D of the focus lens 33 at which the AF evaluation value becomes maximum and a position C at which the AF evaluation value is smaller than the maximum after the position D is passed by. In other words, the CPU 15 can detect a maximum value of the AF evaluation value. At this time (the position C), the movement of the focus lens 33 for the scanning AF process is finished, and the CPU 15 calculates, from the AF evaluation values acquired so far, the position D of the focus lens 33 at which the AF evaluation value becomes maximum.

To speed up the scanning AF process, the CPU 15 does not acquire the AF evaluation value at all positions at which the focus lens 33 can stop, but acquires the AF evaluation value at the AF evaluation value acquisition positions separated by the scanning interval. Thus, there may be a case where the CPU 15 does not acquire the AF evaluation value at the position D and acquires the AF evaluation values at positions a1, a2 and a3 illustrated in FIG. 3. In this case, the CPU 15 can calculate, from a largest AF evaluation value Y1 acquired at the position a1, and the AF evaluation values Y2 and Y3 acquired at the positions a2 and a3 before and after the position a1, the position D (X0) at which the AF evaluation value becomes maximum by the following expression:

$$X0=[(Y3-Y2) \cdot X1+(Y3-Y1) \cdot X2+(Y2-Y1) \cdot X3]/[2 \cdot (Y3-Y1)]$$

where Y1>Y3, Y1≥Y2, and X1, X2 and X3 represent the positions a1, a2, and a3 of the focus lens 33.

A reliability of the acquired AF evaluation value may be determined. Then, when the reliability of the AF evaluation value is determined to be insufficient, the CPU 15 may continue the scanning AF process. This determination of the reliability prevents detection of a false maximum value of the AF evaluation value that could be caused by noise or others and allows detection of a true maximum value of the AF evaluation value. A method of determining the reliability of the AF evaluation value is publicly known as disclosed in, for example, Japanese Patent Laid-open Nos. 2004-101766 and 2004-102130, and thus description of the method will be omitted below.

When the true maximum value of the AF evaluation value is not detected before the focus lens 33 reaches at an edge of the scanning range, the CPU 15 stops the movement of the focus lens 33 and determines that the in-focus state cannot be obtained by the scanning AF process.

When a low reliability of the defocus amount and a high reliability of a defocus direction are obtained as a result of the phase difference AF process first performed at step S124, which is referred to as "case 2", the CPU 15 moves the focus lens 33 from the initial position A in a direction opposite to the defocus direction. Specifically, the CPU 15 moves the focus lens 33 in a direction of "A"→"B" in FIG. 3. In this case, a movement amount (interval) of the focus lens 33 is set to an interval allowing the detection of the position at which the AF evaluation value becomes maximum and allowing acquisition of the AF evaluation value in a predetermined time interval by the scanning AF process. Consequently, a next acquisition of the AF evaluation value is performed at a position b1. For example, the interval is determined by setting a drive speed of the focus lens 33 so that a distance to a next AF evaluation value acquisition position in the fast sensor drive mode is approximately five times larger than a depth of focus of the image capturing optical system.

Then, the CPU 15 returns to step S127 to determine whether the in-focus state can be obtained by the scanning AF process. If determining that the in-focus state cannot be obtained, the CPU 15 returns to step S124.

At step S124, the CPU 15 performs the phase difference AF process using the A- and B-image signals obtained at the position b1. Then, at step S125, if determining that the in-focus state can be obtained from a result of the phase difference AF process, the CPU 15 proceeds to step S128. If determining that the in-focus state cannot be obtained, the CPU 15 determines whether the defocus amount is highly reliable and thus it can be estimated that the in-focus position exists near the position of the focus lens 33 after being moved by the movement amount corresponding to the defocus amount. If the in-focus position can be estimated to be near the position of the focus lens 33, the CPU 15 moves the focus lens 33 from the position b1 to the position B closer to the in-focus position. The same operation as that in case 1 described above is followed.

If having determined that the in-focus state cannot be obtained and the defocus amount is not highly reliable, the CPU 15 proceeds to step S126 to perform the scanning AF process again. Then, the CPU 15 acquires the AF evaluation value at the position b1 and stores the AF evaluation value to the built-in memory of the CPU 15. Then, the CPU 15 moves the focus lens 33 to a position b2 of a next acquisition of the AF evaluation value. Then, the CPU 15 returns to step S124 to perform the phase difference AF process again and determines at step S125 as a result of the phase difference AF process whether the in-focus state can be obtained by the phase difference AF. If the in-focus state cannot be obtained, the CPU 15 performs the scanning AF process at step S126. The CPU 15 again determines whether it can be estimated that the in-focus position exists near the position of the focus lens 33 after moved by the movement amount corresponding to the defocus amount. If the in-focus position can be estimated to be near the position of the focus lens 33, the CPU 15 moves the focus lens 33 from the position b2 to the position B closer to the in-focus position.

In this manner, the CPU 15 repeats the acquisition of the AF evaluation value and the movement of the focus lens 33 after performing each scanning AF process, thereby detecting the position D of the focus lens 33 at which the AF evaluation value becomes maximum and the position C at which the AF evaluation value becomes smaller than the maximum after the position D is passed by as described above. Thus, the CPU 15 performs the same process as that in case 1 to calculate, from the AF evaluation values acquired so far, the position D at which the AF evaluation value becomes maximum.

If determining that the reliability of the acquired AF evaluation value is insufficient, the CPU 15 continues the scanning AF process as described above. When the true maximum value of the AF evaluation value is not detected before the focus lens 33 reaches at the edge of the scanning range, the CPU 15 stops the movement of the focus lens 33 and determines that the in-focus state cannot be obtained by the scanning AF process.

If low reliabilities of the defocus amount and the defocus direction are obtained as a result of the phase difference AF process first performed at step S124, which is referred to as "case 3", the CPU 15 moves the focus lens 33 from the initial position A to an edge position of the scanning range closer to the position A. In the example illustrated in FIG. 3, since the position A is closer to an infinite side edge position I in the scanning range extending from the infinite side edge position I to a near side edge position N, the CPU 15 moves the focus lens 33 to the infinite side edge position I. When the position C is an initial position, the CPU 15 moves the focus lens 33 to the near side edge position N closer to the position C.

Then, the CPU 15 proceeds to step S127 to determine whether the in-focus state can be obtained by the scanning AF process. If determining that the in-focus state cannot be obtained, the CPU 15 returns to step S124.

At step S124, the CPU 15 performs the phase difference AF process using the A- and B-image signals obtained at the infinite side edge position I and determines at step S125 from a result of the phase difference AF process whether the in-focus state can be obtained by the phase difference AF process. If determining that the in-focus state can be obtained, the CPU 15 proceeds to step S128.

If determining that the in-focus state cannot be obtained, the CPU 15 determines whether the defocus amount is highly reliable and thus it can be estimated that the in-focus position exists near the position of the focus lens 33 after moved by the movement amount corresponding to the defocus amount. If the in-focus position can be estimated to be near the position of the focus lens 33, the CPU 15 moves the focus lens 33 from the infinite side edge position I to the position B closer to the in-focus position. The same operation as that in case 1 described above is followed.

If having determined that the in-focus state cannot be obtained and the defocus amount is not highly reliable, the CPU 15 proceeds to step S126 to perform the scanning AF process again. Then, the CPU 15 acquires the AF evaluation value at the position b1 and stores the AF evaluation value to the built-in memory of the CPU 15. The same operation as that in case 2 described above is followed. Specifically, the CPU 15 first drives the focus lens 33 from the infinite side edge position I toward the near side edge position N. The movement amount (interval) of the focus lens 33 is set to the interval allowing the detection of the position at which the AF evaluation value becomes maximum and allowing the acquisition of the AF evaluation value in the predetermined time interval by the scanning AF process. Consequently, a next acquisition of the AF evaluation value is performed at a position c1. For example, the interval is determined by setting the drive speed of the focus lens 33 so that a distance to a next AF evaluation value acquisition position in the fast sensor drive mode is approximately five times larger than the depth of focus of the image capturing optical system.

Then, the CPU 15 proceeds to step S127 to determine whether the in-focus state can be obtained by the scanning AF process. If determining that the in-focus state cannot be obtained, the CPU 15 returns to step S124.

At step S124, the CPU 15 performs the phase difference AF process using the A- and B-image signals obtained at the position c1 closer to the in-focus position. Then, if determining at step S125 from a result of the phase difference AF process that the in-focus state can be obtained by the phase difference AF process, the CPU 15 proceeds to step S128.

If determining that the in-focus state cannot be obtained, the CPU 15 determines whether the defocus amount is highly reliable and thus it can be estimated that the in-focus position exists near the position of the focus lens 33 after moved by the movement amount corresponding to the defocus amount. If the in-focus position can be estimated to be near the position of the focus lens 33, the CPU 15 moves the focus lens 33 from the position c1 to the position B closer to the in-focus position. The same operation as that in case 1 described above is followed.

If having determined that the in-focus state cannot be obtained and the defocus amount is not highly reliable, the CPU 15 proceeds to step S126 to perform the scanning AF process again. Specifically, the CPU 15 stores the AF evaluation value acquired at the position c1 to the built-in memory. Then, the CPU 15 moves the focus lens 33 to a position c2 as a next AF evaluation value acquisition position. Thereafter, the CPU 15 returns to step S124 again to perform the phase difference AF process and then determines at step S125 from a result of the phase difference AF process whether or not the in-focus state can be obtained by the phase difference AF process.

If determining that the in-focus state cannot be obtained, the CPU 15 performs the scanning AF process at step S126. Also in this case, if determining that the in-focus position can be estimated to exist near the position of the focus lens 33 after moved by the movement amount corresponding to the defocus amount, the CPU 15 moves the focus lens 33 from the position c1 to the position B closer to the in-focus position.

In this manner, the CPU 15 repeats the acquisition of the AF evaluation value and the movement of the focus lens 33 after performing each scanning AF process, thereby detecting the position D of the focus lens 33 at which the AF evaluation value becomes maximum and the position C at which the AF evaluation value is smaller than the maximum after the position D is passed by as described above. Thus, the CPU 15 performs the same process as that in case 1 to calculate, from the AF evaluation values acquired so far, the position D at which the AF evaluation value becomes maximum.

If determining that the reliability of the acquired AF evaluation value is insufficient, the CPU 15 continues the scanning AF process as described above. When the true maximum value of the AF evaluation value is not detected before the focus lens 33 reaches at the edge of the scanning range, the CPU 15 stops the movement of the focus lens 33 and determines that the in-focus state cannot be obtained by the scanning AF process.

As described above, the CPU 15 repeats the processes at steps S124 to S127 and acquires at step s128, if determining that the in-focus state can be obtained by the phase difference AF process or the scanning AF process, the BF correction value by a method described later. Then, the CPU 15 corrects, by using the BF correction value, the position of the focus lens 33 (hereinafter referred to as "an AF in-focus position") at which the defocus amount obtained by the phase difference AF process becomes zero or the AF evaluation value obtained by the scanning AF process becomes maximum. Then, the CPU 15 moves the focus lens 33 to a corrected in-focus position obtained by correcting the AF in-focus position.

Thereafter, the CPU 15 displays at step S129 a notification that the AF process has succeeded. For example, the CPU 15 turns on the display element 25 or displays a frame (AF frame) illustrating the AF area on the LCD 8 in a specific color.

On the other hand, if determining that the in-focus state cannot be obtained by the phase difference AF process or the scanning AF process up to step S127, the CPU 15 proceeds to step S129, without performing the acquisition of the BF correction value, to display a notification that the AF process has failed. For example, the CPU 15 turns on flashing of the display element 25 or displays the AF frame on the LCD 8 in a color different from the specific color.

After performing the process at step S129, the CPU 15 determines at step 30 whether the SW2 of the release switch is turned on. If the SW2 is turned on, the CPU 15 proceeds to step S131. If the SW2 is not turned on, the CPU 15 repeats the determination at step S130.

At step S131, the CPU 15 performs image capturing for recording (an exposure process) to acquire a record image to record the record image to the image memory 10. Then, the CPU 15 returns to step S121.

Next, description will be made of a method of acquiring the BF correction value by the CPU 15 at step S128 and a method of correcting the in-focus position by using the BF correction value.

Typically, when aberrations such as spherical aberration occur in an optical system, an in-focus position changes depending on a spatial frequency of an object image. In addition, a band of a filter for extracting a high spatial frequency of the object image, which is used in the scanning AF process, is lower than a band of a spatial frequency obtainable in an image (image signal) acquired by image capturing in some cases. In such a case, the change of the in-focus position depending on the spatial frequency of the object image may cause a user to perceive that the object image is defocused even when the focus lens is moved to a position obtained by the scanning AF process where the AF evaluation value becomes maximum.

In addition, chromatic aberration changes the in-focus position depending on a color (wavelength) of an object. In addition, the AF evaluation value signal used in the scanning AF process is produced in a different manner from that of the image signal acquired by image capturing in some cases. For example, when the AF evaluation value signal is produced as a pseudo luminance signal by applying a specific weight on color components of an image signal output from the image sensor 3, a method of the weighting differs from a method of producing the image signal. In such a case, the user may perceive that the object image is defocused even when the focus lens is moved to the position obtained by the scanning AF process where the AF evaluation value becomes maximum.

Moreover, the in-focus position differs between a horizontal direction and a vertical direction of the image in some cases. Thus, when the scanning AF process only detects a change of the AF evaluation value signal in the horizontal direction, the user may perceive that the image acquired by image capturing is in focus in the horizontal direction but is defocused in the vertical direction.

An amount and a direction of the defocusing depends on a property of the interchangeable lens 31 attached to the camera 1. Thus, depending on the property of the attached interchangeable lens 31, the amount of the defocusing is small enough to have almost no influence. In addition, the focal length (zoom position) and the aperture value of the interchangeable lens 31 and the object distance (image capturing distance) change the amount of the defocusing in some cases. This also applies to the phase difference AF process.

Thus, depending on the optical property of the interchangeable lens 31, this embodiment calculates the corrected in-focus position by correcting, by using the BF correction value, the AF in-focus position obtained by the phase difference AF process and the scanning AF process. The BF correction value differs for different interchangeable lenses and also differs depending on the zoom position (when zooming is possible), the object distance, a position (image height) of the AF area and the color of the object for an individual interchangeable lens.

Next, description will be made of a method of calculating the BF correction value for the second interchangeable lens holding not the data of manufacturing-error parameters but the data of design parameters in the lens EEPROM 37 as described above. This embodiment uses the same BF correction value for the second interchangeable lenses that are different individuals but of the same model. When the second interchangeable lens is attached to the camera 1 for the first time, the camera 1 acquires the data of design parameters from the second interchangeable lens at steps S112 and S113 and calculate the BF correction value by using the acquired data of design parameters to store the BF correction value in the camera EEPROM 19. This acquisition of the data of design parameters eliminates a necessity of an operation of communicating the data of design parameters when the second interchangeable lens of the same model (or the same individual) is attached to the camera 1 next time, which can reduce a time required for starting up the camera 1. In a case in which the second interchangeable lens is sold with the camera 1 and highly frequently attached to and detached from each other, previously storing the BF correction value for the second interchangeable lens in the camera EEPROM 19 can reduce the time required for starting up the camera 1.

The lens EEPROM 37 of the second interchangeable lens stores, for each of the color components (Green, Red and Blue) shown in FIGS. 4A to 4C, differences of imaging positions (in-focus position differences) relative to a base position at respective spatial frequencies of an object. FIGS. 4A to 4C each represent exemplary data in a case where a zoom position Zoom(0)=Wide (wide-angle end), an object distance (in-focus position)=Far and a direction=Horizontal (H). However, the lens EEPROM 37 stores, in reality, data in the same format as that of the exemplary data shown in FIGS. 4A to 4C, for multiple zoom positions including Wide, Middle1 (wide-angle side middle zoom position), Middle2 (telephoto side middle zoom position) and Tele (telephoto end), multiple object distances including Far, Intermediate and Near (close distance) and multiple directions including Horizontal and Vertical (directions). The in-focus position difference is a difference from a base value defined as a value of 0 at an image height (0,0) in a highest band of the spatial frequencies of the object image.

Since optical properties in a positive direction and a negative direction are same in design and thus the BF correction values are also same in these directions, the BF correction values are calculated according to the design parameters for each image height when all the image heights in the data are set to be positive.

The CPU 15 selects two frequency bands close to a frequency band to be used (hereinafter referred to as "a use frequency band) in the scanning AF process or the phase difference AF process and internally divides the in-focus position difference at the two frequency bands by the use frequency band. This process calculates the BF correction value as the in-focus position difference relative to the base position at the use frequency band. Detailed description will be made below.

First, the CPU 15 calculates the use frequency band in the scanning AF process or the phase difference AF process. Description will herein be made of a case where each of the scanning and phase difference AF processes is performed only in the horizontal direction. However, each AF process may be performed in the vertical direction.

The use frequency band in each AF process is represented by freqAF, which is between freqα and freqβ. In this case, an in-focus position difference gPxy(0,0,freqAF) at the image height (0,0) for the color component of Green is calculated as follows:

$$gPxy(0,0,freqAF)=gPxyH(0,0,freq\alpha)+(freqAF-freq\alpha)\cdot[gPxyH(0,0,freq\beta)-gPxyH(0,0,freq\alpha)]/(freq\beta-freq\alpha).$$

Similarly, an in-focus position difference rPxy(0,0, freqAF) at the image height (0,0) for the color component of Red is calculated as follows:

$$rPxy(0,0,freqAF)=rPxyH(0,0,freq\alpha)+(freqAF-freq\alpha)\cdot[rPxyH(0,0,freq\beta)-rPxyH(0,0,freq\alpha)]/(freq\beta-freq\alpha).$$

Furthermore, an in-focus position difference bPxy(0,0, freqAF) at the image height (0,0) for the color component of Blue is calculated as follows:

$$bPxy(0,0,freqAF)=bPxyH(0,0,freq\alpha)+(freqAF-freq\alpha)\cdot[bPxyH(0,0,freq\beta)-bPxyH(0,0,freq\alpha)]/(freq\beta-freq\alpha)$$

Next, the CPU 15 performs weighted averaging depending on proportions of the color components that are used and calculates the in-focus position difference Pxy(0,0,freqAF) at the image height (0,0) in each AF process. The proportions of the color components when the image signal for calculating the AF evaluation value is produced are represented as follows:

Green component:Red component:Blue component=$WgAF:WrAF:WbAF$ where WgAF+WrAF+WbAF=1.

With these proportions, following expression is obtained:

$$Pxy(0,0,freqAF)=WgAF\cdot gPxy(0,0,freqAF)+WrAF\cdot rPxy(0,0,freqAF)+WbAF\cdot bPxy(0,0,freqAF).$$

The use frequency band and the proportions of the color components differ between the scanning AF process and the phase difference AF process in some cases. In these cases, though frequency bands and coefficients referred to in the calculation are different from each other, the same method of the calculation can be used.

Next, the CPU 15 calculates a frequency band at which the user perceives that an image acquired by image capturing (the image is hereinafter referred to as "a captured image") is in a best in-focus state. This frequency band depends on the property of the interchangeable lens, and thus is a highest frequency band in the data held by the interchangeable lens in many cases. However, this assumption may not be true when, for example, manufacturing errors are present, so that, similarly to the use frequency band in each AF process, the CPU 15 selects two frequency bands close to a predetermined frequency band. Then, the CPU 15 calculates the in-focus position difference relative to the reference position at the use frequency band by performing the internal division of the in-focus position difference at the two frequency bands by the use frequency band. In this embodiment, the CPU 15 calculates the in-focus position difference in the horizontal direction and the vertical direction of the captured image.

The predetermined frequency band of the captured image (hereinafter referred to as "a captured image frequency"), which is represented by freqImg, is assumed to be between freq$\alpha$ and freq$\beta$. In this case, the in-focus position difference gPxyH(0,0,freqImg) at the image height (0,0) for the color component of Green in the horizontal direction is calculated as follows.

$$gPxyH(0,0,freqImg)=gPxyH(0,0,freq\alpha)+(freqImg-freq\alpha)\cdot[gPxyH(0,0,freq\beta)-gPxyH(0,0,freq\alpha)]/(freq\beta-freq\alpha)$$

Similarly, the in-focus position difference rPxyH(0,0, freqImg) at the image height (0,0) for the color component of Red in the horizontal direction is calculated as follows.

$$rPxyH(0,0,freqImg)=rPxyH(0,0,freq\alpha)+(freqImg-freq\alpha))\cdot[rPxyH(0,0,freq\beta)-rPxyH(0,0,freq\alpha)]/(freq\beta-freq\alpha)$$

Similarly, the in-focus position difference bPxyH(0,0, freqImg) at the image height (0,0) for the color component of Blue in the horizontal direction is calculated as follows.

$$bPxyH(0,0,freqImg)=bPxyH(0,0,freq\alpha)+(freqImg-freq\alpha)\cdot[bPxyH(0,0,freq\beta)-bPxyH(0,0,freq\alpha)]/(freq\beta-freq\alpha)$$

Similarly, the in-focus position differences gPxyV(0,0, freqImg), rPxyV(0,0,freqImg) and bPxyV(0,0,freqImg) for the respective color components in the vertical direction are calculated as follows.

$$gPxyV(0,0,freqImg)=gPxyV(0,0,freq\alpha)+(freqImg-freq\alpha)\cdot[gPxyV(0,0,freq\beta)-gPxyV(0,0,freq\alpha)]/(freq\beta-freq\alpha)$$

$$rPxyV(0,0,freqImg)=rPxyV(0,0,freq\alpha)+(freqImg-freq\alpha)\cdot[rPxyV(0,0,freq\beta)-rPxyV(0,0,freq\alpha)]/(freq\beta-freq\alpha)$$

$$bPxyV(0,0,freqImg)=bPxyV(0,0,freq\alpha)+(freqImg-freq\alpha)\cdot[bPxyV(0,0,freq\beta)-bPxyV(0,0,freq\alpha)]/(freq\beta-freq\alpha)$$

Next, the CPU 15 performs weighted averaging depending on contribution proportions of horizontal and vertical components and the proportions of the color components when the captured image is produced and calculates the in-focus position difference Pxy(0,0,freqImg) at the image height (0,0) on the captured image. The contribution proportions of the horizontal and vertical components when the captured image is produced is represented as follows:

Horizontal component:Vertical component=$WhImg:WvImg$ where WhImg+WvImg=1.

The proportions of the color components when the captured image is produced are represented as follows:

Green component:Red component:Blue component=$WgImg:WrImg:WbImg$ where WgImg+WrImg+WbImg=1.

With these notations, Pxy(0,0,freqImg) is calculated as follows.

$$Pxy(0,0,freqImg)=WhImg\cdot[WgImg\cdot gPxyH(0,0,freqImg)+WrImg\cdot rPxyH(0,0,freqImg)+WbImg\cdot bPxyH(0,0,freqImg)]+WvImg\cdot[WgImg\cdot gPxyV(0,0,freqImg)+WrImg\cdot rPxyV(0,0,freqImg)+WbImg\cdot bPxyV(0,0,freqImg)]$$

Thereby, the BF correction value BF(0,0,0,0) for a zoom position=Zoom(0), a focus position=Far and the image height (0,0) is calculated as follows.

$$BF(0,0,0.0)=Pxy(0,0,freqImg)-Pxy(0,0,freqAF)$$

The BF correction value can be calculated similarly for other image heights. The in-focus position difference at an image height (x, y) at the use frequency band in the AF process, the in-focus position difference and the BF correction value at a frequency band at which the captured image is perceived as being in a best in-focus state are calculated as follows.

$Pxy(x,y,\text{freqAF})=WgAF \cdot gPxy(x,y,\text{freqAF})+WrAF \cdot rPxy(x,y,\text{freqAF})+WbAF \cdot bPxy(x,y,\text{freqAF})$ $Pxy(x,y,\text{freqImg})=Wh\text{Img} \cdot [WgImg \cdot gPxyH(x,y,\text{freqImg})+WrImg \cdot rPxyH(x,y,\text{freqImg})+WbImg \cdot bPxyH(x,y,\text{freqImg})]+Wv\text{Img} \cdot [WgImg \cdot gPxyV(x,y,\text{freqImg})+WrImg \cdot rPxyV(x,y,\text{freqImg})+WbImg \cdot bPxyV(x,y,\text{freqImg})]$ $BF(x,y,0.0)=Pxy(x,y,\text{freqImg})-Pxy(x,y,\text{freqAF})$ The BF correction value based on the design parameters for each image height is positive in the horizontal and vertical directions with respect to a center of the image capturing frame. This is because, as described above, the optical properties, and thus the BF correction values, are same in the positive direction and the negative direction in design.

Similarly, the CPU 15 calculates the BF correction value for other zoom positions and other focus positions. In this manner, the CPU 15 calculates the BF correction values for all zoom positions, all focus positions and all image heights and stores data thereof in the camera EEPROM 19.

Thereafter, the CPU 15 calculates the corrected in-focus position by adding the BF correction value stored in the camera EEPROM 19 to the AF in-focus position of the focus lens 33 at which the defocus amount obtained by the phase difference AF process becomes zero or the AF evaluation value obtained by the scanning AF process becomes maximum. Then, the CPU 15 moves the focus lens 33 to the corrected in-focus position.

In the calculation of the corrected in-focus position, since an image height to obtain the in-focus state (hereinafter referred to "an in-focus target image height"), the zoom position and the focus position are already determined, the CPU 15 is only required to read the BF correction value corresponding to these image height, zoom position and focus position from the camera EEPROM 19.

However, as for the image height, the defocus amount obtained by the phase difference AF process and the AF evaluation value obtained by the scanning AF process at an image height other than the in-focus target image height are used in some cases. In such a case, the BF correction value corresponding to the in-focus target image height may be calculated by an interpolation using the BF correction values at multiple image heights neighboring the in-focus target image height. For example, the camera EEPROM 19 stores the BF correction values at the image heights (0,0), (x1,0), (x2,0), (0,y1) and (0,y2).

Center coordinates of the AF area in which the A- and B-image signals on which the correlation calculation is performed are acquired in the phase difference AF process and center coordinates of the AF area in the scanning AF process are each represented by (x,y). With this notation, the BF correction value BF(x,y,zoom.focus) at the image height (x, y) for a zoom position "zoom" and a focus position "focus" is calculated as follows.

$BF(x,y,\text{zoom.focus})=\sqrt{[BF(x,0,\text{zoom.focus})^2+BF(0,y,\text{zoom.focus})^2]}$ where BF(x,0,zoom.focus) is the BF correction value in a horizontal image height, and BF(0,y,zoom.focus) is the BF correction value in a vertical image height. BF(x,0,zoom.focus) and BF(0,y,zoom.focus) are calculated as follows.

When $0 \leq x \leq x1$, $BF(x,0,\text{zoom.focus})=BF(0,0,\text{zoom.focus})+[BF(x1,0,\text{zoom.focus})-BF(0,0,\text{zoom.focus})] \cdot x/x1$.

When $x1 < x \leq x2$, $BF(x,0,\text{zoom.focus})=BF(x1,0,\text{zoom.focus})+[BF(x2,0,\text{zoom.focus})-BF(x1,0,\text{zoom.focus})] \cdot (x-x1)/(x2-x1)$.

When $x2 < x$, $BF(x,0,\text{zoom.focus})=BF(x2,0,\text{zoom.focus})$.

When $0 \leq y \leq y1$, $BF(0,y,\text{zoom.focus})=BF(0,0,\text{zoom.focus})+[BF(0,y1,\text{zoom.focus})-BF(0,0,\text{zoom.focus})] \cdot y/y1$.

When $y1 < y \leq y2$, $BF(0,y,\text{zoom.focus})=BF(0,y1,\text{zoom.focus})+[BF(0,y2,\text{zoom.focus})-BF(0,y1,\text{zoom.focus})] \cdot (y-y1)/(y2-y1)$.

When $y2 < y$, $BF(0,y,\text{zoom.focus})=BF(0,y2,\text{zoom.focus})$.

Next, description will be made of a method of calculating the BF correction value for the first interchangeable lens holding the data of the design parameters and the manufacturing-error parameters in the lens EEPROM 37. The first interchangeable lens is an interchangeable lens whose manufacturing errors of the image capturing optical system largely affect a difference between an in-focus position at a frequency band at which a captured image is perceived as being in a best in-focus state and an in-focus position obtained as a result of the AF process. For such a first interchangeable lens, the manufacturing errors are measured at manufacturing, and manufacturing-error parameters obtained by the measurement are stored in the lens EEPROM 37. The lens EEPROM 37 stores the design parameters as the data listed in FIGS. 4A to 4C.

FIGS. 5 to 7 illustrate exemplary data of manufacturing-error parameters. The manufacturing-error parameters are positive and negative in the horizontal and vertical directions with respect to the center of the image capturing frame. Unlike the designed values, a central position shift (axis shift) and leaning (surface tilt) of each lens included in the image capturing optical system as the manufacturing errors lead to different optical properties in the positive and negative directions, and thus to different BF correction values.

FIG. 5 illustrates exemplary data in a case of a zoom position Zoom(0)=Wide, a focus position=Far and a direction=horizontal (H). In reality, the lens EEPROM 37 stores data in the same format that of the exemplary data, for multiple zoom positions (Wide, Middle1, Middle2 and Tele), multiple focus positions (Far, Intermediate and Near), and multiple directions (Horizontal and Vertical). The manufacturing-error parameters are differences between actual values and the designed values for multiple design items. The manufacturing-error parameters differs between individual first interchangeable lenses of the same model. Thus, except for a case in which the same individual lens is attached again, the CPU 15 acquires the data of the manufacturing-error parameters from the first interchangeable lens each time the first interchangeable lens is attached to the camera 1 (steps S105 and S106). Then, the data is used to calculate the BF correction value (step S128).

However, the manufacturing-error parameters of the same individual lens change by maintenance such as adjustment or repair (the manufacturing-error parameters in the lens EEPROM 37 are rewritten) in some cases. Thus, whether or not the attached first interchangeable lens is the same individual lens, the CPU 15 may acquire the data of the manufacturing-error parameters from the lens to calculate the BF correction value.

When the first interchangeable lens is attached, a sum of the BF correction value (hereinafter referred to as "a design BF correction value") calculated from the design parameters listed in FIGS. 4A to 4C and the manufacturing-error BF correction value calculated from the manufacturing-error parameters is used as a combined BF correction value to be added to the AF in-focus position. When the combined BF correction value and the corrected in-focus position are calculated at step S128, the in-focus target image height, the zoom position and the focus position are already determined. Thus, the CPU 15 calculates the design and manufacturing-error BF correction values respectively from the design parameters and manufacturing-error parameters corresponding to the image height, the zoom position and the focus position to calculate the combined BF correction value.

As described above, the defocus amount obtained by the phase difference AF process and the AF evaluation value obtained by the scanning AF process at an image height other than the in-focus target image height are used in some cases. In such a case, the design and manufacturing-error BF correction values corresponding to the in-focus target image height by an interpolation using the design and manufacturing-error parameters at multiple image heights neighboring the in-focus target image height, and thus the combined BF correction value are calculated.

Next, description will be made of a specific method of calculating the design BF correction value and the manufacturing-error BF correction value. First, the design BF correction value at the determined zoom position, focus position and image height is calculated.

The design BF correction value BF(x,y,zoom.Focus)_design is calculated in a similar manner to the BF correction value for the second interchangeable lens described above.

The center coordinates of the AF area where the A- and B-image signals on which the correlation calculation is performed in the phase difference AF process are acquired and the center coordinates of the AF area in the scanning AF process are each represented by (x,y). With this notation, the design BF correction value BF(x,y,zoom.focus)_design at the image height (x,y) (where the design BF correction value is positive at the image height) for the zoom position "zoom" and the focus position "focus" is calculated as follows:

$$BF(x,y,\text{zoom.focus})\_\text{design}=\sqrt{[BF(x,0,\text{zoom.focus})^2+BF(0,y,\text{zoom.focus})^2]}$$

where BF(x,0,zoom.focus) is the design BF correction value in the horizontal image height, and BF(0,y,zoom.focus) is the design BF correction value in the vertical image height. BF(x,0,zoom.focus) and BF(0,y,zoom.focus) are calculated as follows.

when $0 \leq x \leq x1$, $$BF(x,0,\text{zoom.focus})=BF(0,0,\text{zoom.focus})+[BF(x1,0,\text{zoom.focus})-BF(0,0,\text{zoom.focus})]\cdot x/x1.$$

When $x1<x\leq x2$, $$BF(x,0,\text{zoom.focus})=BF(x1,0,\text{zoom.focus})+[BF(x2,0,\text{zoom.focus})-BF(x1,0,\text{zoom.focus})]\cdot (x-x1)/(x2-x1).$$

When $x2<x$, $$BF(x,0,\text{zoom.focus})=BF(x2,0,\text{zoom.focus}).$$

When $0 \leq y \leq y1$, $$BF(0,y,\text{zoom.focus})=BF(0,0,\text{zoom.focus})+[BF(0,y1,\text{zoom.focus})-BF(0,0,\text{zoom.focus})]\cdot y/y1).$$

When $y1<y\leq y2$, $$BF(0,y,\text{zoom.focus})=BF(0,y1,\text{zoom.focus})+[BF(0,y2,\text{zoom.focus})-BF(0,y1,\text{zoom.focus})]\cdot (y-y1)/(y2-y1).$$

When $y2<y$, $$BF(0,y,\text{zoom.focus})=BF(0,y2,\text{zoom.focus}).$$

The design BF correction value BF(x,0,zoom.focus) and BF(0,y,zoom.focus) in the horizontal image height and the vertical image height are expressed as follows.

$$BF(x,0,\text{zoom.focus})=Pxy(x,0,\text{freqImg})-Pxy(x,0,\text{freqAF})$$

$$BF(0,y,\text{zoom.focus})=Pxy(0,y,\text{freqImg})-Pxy(0,y,\text{freqAF})$$

Specifically, the design BF correction value BF(x,0,zoom.focus) and BF(0,y,zoom.focus) are calculated as a difference between: the in-focus position at the use frequency (hereinafter also referred to as "an AF object frequency") freqAF used in the phase difference AF or the scanning AF process at the zoom position, the focus position, and the image height before the interpolation; and the in-focus position at the captured image frequency freqImg at which the captured image is perceived as being in the best in-focus state (the frequency freqImg is hereinafter also referred to as "a best in-focus object frequency").

The in-focus position at the AF object frequency freqAF and the in-focus position at the best in-focus object frequency freqImg are calculated as follows:

$$Pxy(x,y,\text{freqAF})=W\!g\text{AF}\cdot gPxy(x,y,\text{freqAF})+W\!r\text{AF}\cdot rPxy(x,y,\text{freqAF})+W\!b\text{AF}\cdot bPxy(x,y,\text{freqAF})$$

$$Pxy(x,y,\text{freqImg})=W\!h\text{Img}\cdot[W\!g\text{Img}\cdot gPxyH(x,y,\text{freqImg})+W\!r\text{Img}\cdot rPxyH(x,y,\text{freqImg})+W\!b\text{Img}\cdot bPxyH(x,y,\text{freqImg})]+W\!v\text{Img}\cdot[W\!g\text{Img}\cdot gPxyV(x,y,\text{freqImg})+W\!r\text{Img}\cdot rPxyV(x,y,\text{freqImg})+W\!b\text{Img}\cdot bPxyV(x,y,\text{freqImg})]$$

where freqAF is assumed to be between freqα and freqβ in the frequency band used in the AF process. In the above expression, gPxy(x,y,freqAF), rPxy(x,y,freqAF) and bPxy(x,y,freqAF) are focal values at the image height (x,y) for the color components of Green, Red and Blue, respectively, and are calculated as follows.

$$gPxy(x,y,\text{freqAF})=gPxyH(x,y,\text{freq}\alpha)+(\text{freqAF}-\text{freq}\alpha)\cdot[gPxyH(x,y,\text{freq}\beta)-gPxyH(x,y,\text{freq}\alpha)]/(\text{freq}\beta-\text{freq}\alpha)$$

$$rPxy(x,y,\text{freqAF})=rPxyH(x,y,\text{freq}\alpha)+(\text{freqAF}-\text{freq}\alpha)\cdot[rPxyH(x,y,\text{freq}\beta)-rPxyH(x,y,\text{freq}\alpha)]/(\text{freq}\beta-\text{freq}\alpha)$$

$$bPxy(x,y,\text{freqAF})=bPxyH(x,y,\text{freq}\alpha)+(\text{freqAF}-\text{freq}\alpha)\cdot[bPxyH(x,y,\text{freq}\beta)-bPxyH(x,y,\text{freq}\alpha)]/(\text{freq}\beta-\text{freq}\alpha)$$

WgAF, WrAF and WbAF are the proportions of the color components of Green, Red and Blue, respectively, when the AF evaluation value signal is produced and have a relation below:

$$W\!g\text{AF}+W\!r\text{AF}+W\!b\text{AF}=1.$$

Furthermore, freqImg is assumed to be between freqα and freqβ in the frequency band of the captured image. PxyH(x,y,freqImg), rPxyH(x,y,freqImg) and bPxyH(x,y,freqImg) are focal values in the horizontal direction at the image height (x,y) for the color components of Green, Red and Blue, respectively, and calculated as follows.

$gPxyH(x,y,\text{freqImg})=gPxyH(x,y,\text{freq}\alpha)+(\text{freqImg}-\text{freq}\alpha)\cdot[gPxyH(x,y,\text{freq}\beta)-gPxyH(x,y,\text{freq}\alpha)]/(\text{freq}\beta-\text{freq}\alpha)$ $rPxyH(x,y,\text{freqImg})=rPxyH(x,y,\text{freq}\alpha)+(\text{freqImg}-\text{freq}\alpha)\cdot[rPxyH(x,y,\text{freq}\beta)-rPxyH(x,y,\text{freq}\alpha)]/(\text{freq}\beta-\text{freq}\alpha)$ $bPxyH(x,y,\text{freqImg})=bPxyH(x,y,\text{freq}\alpha)+(\text{freqImg}-\text{freq}\alpha)\cdot[bPxyH(x,y,\text{freq}\beta)-bPxyH(x,y,\text{freq}\alpha)]/(\text{freq}\beta-\text{freq}\alpha)$ Moreover, gPxyV(x,y,freqImg), rPxyV(x,y,freqImg) and bPxyV(x,y,freqImg) are the focal values in the vertical direction at the image height (x,y) for the color components of Green, Red and Blue, respectively, and calculated as follows.

$gPxyV(x,y,\text{freqImg})=gPxyV(x,y,\text{freq}\alpha)+(\text{freqImg}-\text{freq}\alpha)\cdot[gPxyV(x,y,\text{freq}\beta)-gPxyV(x,y,\text{freq}\alpha)]/(\text{freq}\beta-\text{freq}\alpha)$ $rPxyV(x,y,\text{freqImg})=rPxyV(x,y,\text{freq}\alpha)+(\text{freqImg}-\text{freq}\alpha)\cdot[rPxyV(x,y,\text{freq}\beta)-rPxyV(x,y,\text{freq}\alpha)]/(\text{freq}\beta-\text{freq}\alpha)$ $bPxyV(x,y,\text{freqImg})=bPxyV(x,y,\text{freq}\alpha)+(\text{freqImg}-\text{freq}\alpha)\cdot[bPxyV(x,y,\text{freq}\beta)-bPxyV(x,y,\text{freq}\alpha)]/(\text{freq}\beta-\text{freq}\alpha)$ WhImg and WvImg are the proportions of the horizontal component and the vertical component when the captured image is produced and have a relation below:

$Wh\text{Img}+Wv\text{Img}=1.$

WgImg, WrImg and WbImg are the proportions of the color components when the captured image is produced and have a relation below:

$Wg\text{Img}+Wr\text{Img}+Wb\text{Img}=1.$

Subsequently, the manufacturing-error BF correction value at the determined zoom position, focus position and image height is calculated. The manufacturing errors BF correction value has no origin symmetry for the image height due to the axis shift and the surface tilt. Thus, the image height is denoted with a sign in calculation of the manufacturing-error BF correction value. The exemplary data in FIGS. 5 to 7 holds the manufacturing-error parameters for the image heights (0,0), (x1,0), (x2,0), (0,y1), (0,y2), (−x1,0), (−x2,0), (0,−y1) and (0,−y2). For other image heights, an interpolation is performed using values at image heights neighboring the other image heights.

The center coordinates of the AF area in which the A- and B-image signals on which the correlation calculation is performed in the phase difference AF process are acquired and the center coordinates of the AF area in the scanning AF process are each represented by (x,y).

With this notation, the manufacturing-error BF correction value BF(x,y,zoom.focus)_manufact at the image height (x,y) for the zoom position "zoom" and the focus position "focus" is calculated as follows. For the image height, the manufacturing-error BF correction value is denoted with a sign.

$BF(x,y,\text{zoom.focus})\_\text{manufact}=\sqrt{[BF(x,0,\text{zoom.focus})\_\text{manufact}^2+BF(0,y,\text{zoom.focus})\_\text{manufact}^2]}$ In the above expression, BF(x,0,zoom.focus)_manufact is the manufacturing-error BF correction value in the horizontal image height, and BF(0,y,zoom.focus)_manufact is the manufacturing-error BF correction value in the vertical image height. BF(x,0,zoom.focus)_manufact and BF(0,y,zoom.focus)_manufact are calculated as follows.

When $0 \leq x \leq x1$, $BF(x,0,\text{zoom.focus})\_\text{manufact}=BF(0,0,\text{zoom.focus})\_\text{manufact}+[BF(x1,0,\text{zoom.focus})\_\text{manufact}-BF(0,0,\text{zoom.focus})\_\text{manufact}]\cdot x/x1.$ When $-x1 \leq x \leq 0$, $BF(x,0,\text{zoom.focus})\_\text{manufact}=BF(0,0,\text{zoom.focus})\_\text{manufact}-[BF(-x1,0,\text{zoom.focus})\_\text{manufact}-BF(0,0,\text{zoom.focus})\_\text{manufact}]\cdot x/x1.$ When $x1 < x \leq x2$, $BF(x,0,\text{zoom.focus})\_\text{manufact}=BF(x1,0,\text{zoom.focus})\_\text{manufact}+[BF(x2,0,\text{zoom.focus})\_\text{manufact}-BF(x1,0,\text{zoom.focus})\_\text{manufact}]\cdot(x-x1)/(x2-x1).$ When $-x2 \leq -x < -x1$, $BF(x,0,\text{zoom.focus})\_\text{manufact}=BF(-x1,0,\text{zoom.focus})\_\text{manufact}-[BF(-x2,0,\text{zoom.focus})\_\text{manufact}-BF(-x1,0,\text{zoom.focus})\_\text{manufact}]\cdot(x-x1)/(x2-x1).$ When $x2 < x$, $BF(x,0,\text{zoom.focus})\_\text{manufact}=BF(x2,0,\text{zoom.focus})\_\text{manufact}.$ When $x < -x2$, $BF(x,0,\text{zoom.focus})\_\text{manufact}=BF(-x2,0,\text{zoom.focus})\_\text{manufact}.$ When $0 \leq y \leq y1$, $BF(y,0,\text{zoom.focus})\_\text{manufact}=BF(0,0,\text{zoom.focus})\_\text{manufact}+[BF(y1,0,\text{zoom.focus})\_\text{manufact}-BF(0,0,\text{zoom.focus})\_\text{manufact}]\cdot y/y1.$ When $-y1 \leq y \leq 0$, $BF(y,0,\text{zoom.focus})\_\text{manufact}=BF(0,0,\text{zoom.focus})\_\text{manufact}-[BF(-y1,0,\text{zoom.focus})\_\text{manufact}-BF(0,0,\text{zoom.focus})\_\text{manufact}]\cdot y/y1.$ When $y1 < y \leq y2$, $BF(y,0,\text{zoom.focus})\_\text{manufact}=BF(y1,0,\text{zoom.focus})\_\text{manufact}+[BF(y2,0,\text{zoom.focus})\_\text{manufact}-BF(y1,0,\text{zoom.focus})\_\text{manufact}]\cdot(y-y1)/(y2-y1).$ When $-y2 \leq -y < -y2$, $BF(y,0,\text{zoom.focus})\_\text{manufact}=BF(-y1,0,\text{zoom.focus})\_\text{manufact}-[BF(-y2,0,\text{zoom.focus})\_\text{manufact}-BF(-y1,0,\text{zoom.focus})\_\text{manufact}]\cdot(y-y1)/(y2-y1).$ When $y2 < y$, $BF(y,0,\text{zoom.focus})\_\text{manufact}=BF(y2,0,\text{zoom.focus})\_\text{manufact}.$ When $y < -y2$, $BF(y,0,\text{zoom.focus})\_\text{manufact}=BF(-y2,0,\text{zoom.focus})\_\text{manufact}.$ The manufacturing-error BF correction value BF(x,0,zoom.focus)_manufact and BF(0,y,zoom.focus)_manufact in the horizontal image height and the vertical image height are expressed as follows, respectively.

$BF(x,0,\text{zoom.focus})\_\text{manufact}=Pxy(x,0,\text{freqImg})\_\text{manufact}-Pxy(x,0,\text{freqAF})\_\text{manufact}$ $BF(0,y,\text{zoom.focus})\_\text{manufact}=Pxy(0,y,\text{freqImg})\_\text{manufact}-Pxy(0,y,\text{freqAF})\_\text{manufact}$ In other words, the manufacturing-error BF correction value BF(x,0,zoom.focus)_manufact and BF(0,y,zoom.focus)_manufact are calculated as the difference between: the in-focus position at the AF object frequency freqAF used in the phase difference or scanning AF process at the zoom position, the focus position and the image height before the interpolation; and the in-focus position at the best in-focus object frequency freqImg at which the captured image is perceived as being in the best in-focus state)

The in-focus position at the AF object frequency freqAF and the in-focus position at the best in-focus object frequency freqImg are calculated as follows:

$$Pxy(x,y,\text{freqAF})\_\text{manufact}=WgAF\cdot gPxy(x,y,\text{freqAF})+WrAF\cdot rPxy(x,y,\text{freqAF})+WbAF\cdot bPxy(x,y,\text{freqAF})$$

$$Pxy(x,y,\text{freqImg})\_\text{manufact}=WhImg\cdot[WgImg\cdot gPxyH(x,y,\text{freqImg})+WrImg\cdot rPxyH(x,y,\text{freqImg})+WbImg\cdot bPxyH(x,y,\text{freqImg})]+WvImg\cdot[WgImg\cdot gPxyV(x,y,\text{freqImg})+WrImg\cdot rPxyV(x,y,\text{freqImg})+WbImg\cdot bPxyV(x,y,\text{freqImg})]$$

where freqAF is assumed to be between freqα and freqβ in the frequency band used in the AF process.

Furthermore, gPxy(x,y,freqAF), rPxy(x,y,freqAF) and bPxy(x,y,freqAF) are focal values at the image height (x,y) for the color components of Green, Red and Blue and calculated as follows.

$$gPxy(x,y,\text{freqAF})=gPxyH(x,y,\text{freq}\alpha)+(\text{freqAF}-\text{freq}\alpha)\cdot[gPxyH(x,y,\text{freq}\beta)-gPxyH(x,y,\text{freq}\alpha)]/(\text{freq}\beta-\text{freq}\alpha)$$

$$rPxy(x,y,\text{freqAF})=rPxyH(x,y,\text{freq}\alpha)+(\text{freqAF}-\text{freq}\alpha)\cdot[rPxyH(x,y,\text{freq}\beta)-rPxyH(x,y,\text{freq}\alpha)]/(\text{freq}\beta-\text{freq}\alpha)$$

$$bPxy(x,y,\text{freqAF})=bPxyH(x,y,\text{freq}\alpha)+(\text{freqAF}-\text{freq}\alpha)\cdot[bPxyH(x,y,\text{freq}\beta)-bPxyH(x,y,\text{freq}\alpha)]/(\text{freq}\beta-\text{freq}\alpha)$$

WgAF, WrAF and WbAF are the proportions of the color components of Green, Red and Blue when the AF evaluation value signal is produced, respectively, and have a relation below.

$$WgAF+WrAF+WbAF=1$$

Moreover, freqImg is assumed to be between freqα and freqβ in the frequency band of the captured image.

In addition, gPxyH(x,y,freqImg), rPxyH(x,y,freqImg) and bPxyH(x,y,freqImg) are focal values in the horizontal direction at the image height (x,y) for the color components of Green, Red and Blue, respectively, and calculated as follows.

$$gPxyH(x,y,\text{freqImg})=gPxyH(x,y,\text{freq}\alpha)+(\text{freqImg}-\text{freq}\alpha)\cdot[gPxyH(x,y,\text{freq}\beta)-gPxyH(x,y,\text{freq}\alpha)]/(\text{freq}\beta-\text{freq}\alpha)$$

$$rPxyH(x,y,\text{freqImg})=rPxyH(x,y,\text{freq}\alpha)+(\text{freqImg}-\text{freq}\alpha)\cdot[rPxyH(x,y,\text{freq}\beta)-rPxyH(x,y,\text{freq}\alpha)]/(\text{freq}\beta-\text{freq}\alpha)$$

$$bPxyH(x,y,\text{freqImg})=bPxyH(x,y,\text{freq}\alpha)+(\text{freqImg}-\text{freq}\alpha)\cdot[bPxyH(x,y,\text{freq}\beta)-bPxyH(x,y,\text{freq}\alpha)]/(\text{freq}\beta-\text{freq}\alpha)$$

Moreover, gPxyV(x,y,freqImg), rPxyV(x,y,freqImg) and bPxyV(x,y,freqImg) are focal values in the vertical direction at the image height (x,y) for the color components of Green, Red and Blue, respectively, and calculated as follows.

$$gPxyV(x,y,\text{freqImg})=gPxyV(x,y,\text{freq}\alpha)+(\text{freqImg}-\text{freq}\alpha)\cdot[gPxyV(x,y,\text{freq}\beta)-gPxyV(x,y,\text{freq}\alpha)]/(\text{freq}\beta-\text{freq}\alpha)$$

$$rPxyV(x,y,\text{freqImg})=rPxyV(x,y,\text{freq}\alpha)+(\text{freqImg}-\text{freq}\alpha)\cdot[rPxyV(x,y,\text{freq}\beta)-rPxyV(x,y,\text{freq}\alpha)]/(\text{freq}\beta-\text{freq}\alpha)$$

$$bPxyV(x,y,\text{freqImg})=bPxyV(x,y,\text{freq}\alpha)+(\text{freqImg}-\text{freq}\alpha)\cdot[bPxyV(x,y,\text{freq}\beta)-bPxyV(x,y,\text{freq}\alpha)]/(\text{freq}\beta-\text{freq}\alpha)$$

WhImg and WvImg are the proportions of the horizontal component and the vertical component when the captured image is produced and have a relation below.

$$WhImg+WvImg=1$$

WgImg, WrImg and WbImg are the proportions of the color components when the captured image is produced, and have a relation below.

$$WgImg+WrImg+WbImg=1$$

In this manner, the CPU 15 calculates the design BF correction value BF(x,y,zoom.focus)_design and manufacturing-error BF correction value BF(x,y,zoom.focus)_manufact. The CPU 15 further calculates the combined BF correction value as the sum of these correction values. Then, as described above, the CPU 15 calculates the corrected in-focus position by adding the combined BF correction value to the AF in-focus position.

Figure 8:
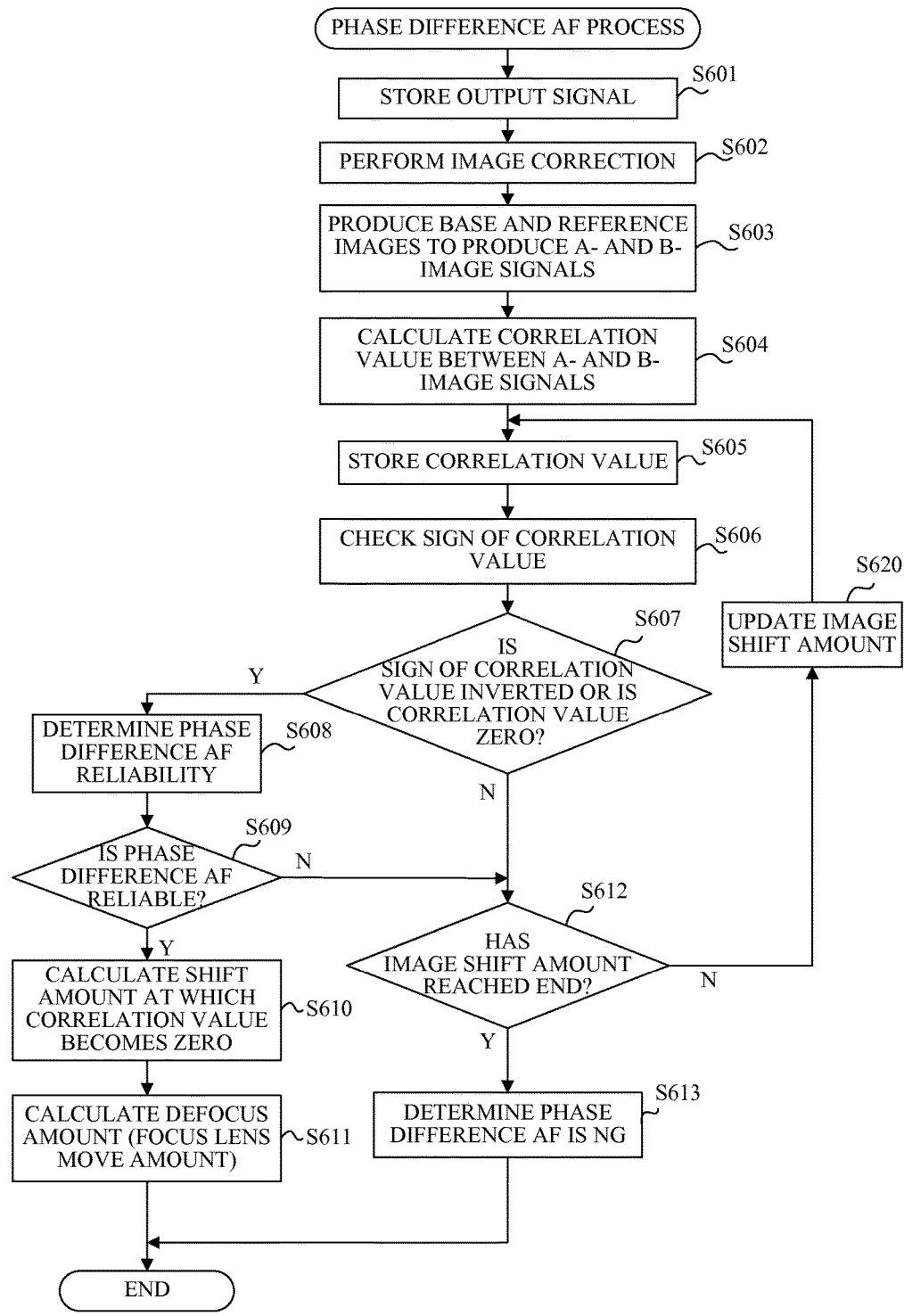
FIG. 8 is a flowchart of a phase difference AF process performed by the camera of Embodiment 1.

Next, description will be made of the phase difference AF process performed by the CPU 15 at step S124 in FIG. 2B with reference to FIG. 8.

First, at step S601, the CPU 15 stores the A- and B-image signals for the phase difference AF that are output from the A/D convertor 5, to a storing region of the phase difference AF process circuit 13.

Next, at step S602, the CPU 15 causes the phase difference AF process circuit 13 to correct the A- and B-image signals. In this embodiment, the image sensor 3 includes pixels disposed for the phase difference AF. Thus, unlike in a case in which a light flux is re-imaged on a sensor dedicated to the phase difference AF through a secondary imaging optical system, a field lens that corrects image distortion due to difference in light fluxes at different image heights and an aperture stop that restricts a pupil position of the light flux entering the sensor dedicated to the phase difference AF cannot be disposed.

Moreover, a mask for shielding an unnecessary light flux cannot be disposed. Thus, since the signals for the phase difference AF which are read out from the image sensor 3 differ in shading and offset between the pixels, a correction (image correction) thereof is needed.

The shading differs depending on a position (image height) of the pixel from an optical axis center, a position of the exit pupil of the image capturing optical system, a position of the aperture stop and a position of an aperture in the pixel for the phase difference AF. The offset differs depending on an amplification rate of a signal from the pixel for the phase difference AF, the position of the aperture in the pixel for the phase difference AF and properties of a column amplifier for the pixels for the phase difference AF. Thus, an image correction amount is set depending on each factor, and an image correction is performed on each pixel depending on the factor. Since a method of the image correction is disclosed in Japanese Patent Laid-open No. 2012-252280, description will be omitted.

Figure 9:
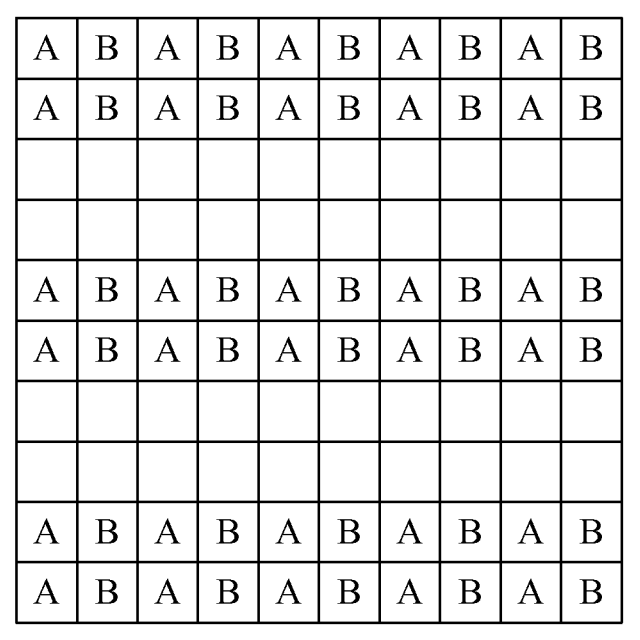

At step S603 after the image correction, the CPU 15 causes the phase difference AF process circuit 13 to rearrange the pixels for the phase difference AF to produce a base image (A-image) and a reference image (B-image). The pixels for the phase difference AF are arranged as illustrated in FIG. 9, for example. In FIG. 9, among the pixels for the phase difference AF, a pixel A is used for producing the A-image signal, and a pixel B is used for producing the B-image signal. Other pixels are used for image capturing.

Outputs from the pixel A and pixel B for the phase difference AF are stored in the phase difference AF process circuit 13, the outputs are read in an order of the pixel A→the pixel B→the pixel A→the pixel B→ . . . →the pixel A→the pixel B. These outputs are stored in the storing region of the phase difference AF process circuit 13 still in the same order after the image correction at step S602. The CPU 15 causes the phase difference AF process circuit 13 to extract the outputs from the pixels A from the storing region and arrange them in an order of the extraction to produce the A-image signal. Similarly, the CPU 15 causes the phase difference AF process circuit 13 to extract the outputs from the pixels B and arrange them in an order of the extraction to produce the B-image signal.

Thereafter, at step S604, the CPU 15 causes the phase difference AF process circuit 13 to set an initial value (initial position) when the correlation calculation is performed. Having set the initial value, the phase difference AF process circuit 13 performs the correlation calculation by following expression (1) to calculate a correlation value of the A-image signal (aj+1) and the B-image signal (bj+k):

$$U_k = \sum_j \max(a_{j+1}, b_{j+k}) - \sum_j \max(a_j, b_{j+k+1}) \quad (1)$$

where max(a, b) is a function that extracts a larger value of a and b, and k represents an amount of image shift (pixel shift) when the correlation calculation is performed. Furthermore, j represents the number of pixels on which the correlation calculation is performed and that is initialized at step S604.

Next, at step S605, the CPU 15 acquires the calculated correlation value of the A- and B-image signals from the phase difference AF process circuit 13 and stores the acquired correlation value to an internal memory.

Next, at step S606, if any correlation value is already stored in the internal memory, the CPU 15 checks whether a sign of the acquired correlation value is the same as that of a correlation value stored previously.

Then, at step S607, if the signs of the correlation values are not same (that is, are inverted) or the acquired correlation value is zero, the CPU 15 proceeds to step S608. On the other hand, if the signs of the correlation values are not inverted, the CPU 15 proceeds to step S612 and determines whether the image shift amount k has reached its end value in the correlation calculation. If the image shift amount k have not reached the end value, the CPU 15 updates the image shift amount k to k+1 at step S620. If the image shift amount k have reached the end value, the CPU 15 determines at step S613 that the phase difference AF has failed and ends this process.

On the other hand, at step S608, the CPU 15 determines a reliability of a result of the phase difference AF process. In this determination, the reliability is determined to be one of the following four cases:

(a) an in-focus state can be obtained by the phase difference AF process (in-focus state is achievable);

(b) an in-focus state cannot be obtained by the phase difference AF process but the calculated defocus amount has a high reliability, and thus it is estimated that an in-focus position exists near the position of the focus lens moved by the movement amount corresponding to the defocus amount (in-focus position estimation is possible);

(c) the calculated defocus amount has a low reliability, but the defocus direction has a high reliability (direction detection is possible); and (d) the calculated defocus amount and direction have low reliabilities (NG).

This determination is performed by using the calculated defocus amount, levels of the A- and B-image signals when the defocus amount is calculated and the similarity between the A- and B-image signals.

First, the levels of the A- and B-image signals are checked and compared with a predetermined value. A smaller one of a difference between maximum and minimum values of the A-image signal and a difference between maximum and minimum values of the B-image signal is set as a peak bottom value (hereinafter referred to as "a PB value") of the A- and B-image signals.

Next, an index FLVL representing the similarity between the A- and B-image signals is calculated. Two correlation amounts Ma(k) and Mi(k) are calculated by using following expressions (2):

$$Ma(k) = \sum_j \max(a_j, b_{j+k}) \quad (2)$$

$$Mi(k) = \sum_j \mathrm{main}(a_j, b_{j+k})$$

where max(a, b) is the function that extracts a larger value of a and b as described above, and min(a, b) is a function that extracts a smaller value of a and b.

When the similarity between the A- and B-image signals are extremely high, in other words, when the A- and B-image signals coincide with each other, an image shift amount making Ma(k) and Mi(k) equal to each other exists. However, in reality, the image shift amount making Ma(k) and Mi(k) equal to each other is likely to be not an integer, and the A- and B-image signals are unlikely to completely coincide with each other due to noise included in output signals from the image sensor 3 and the use of different pixels for producing the A- and B-image signals. Thus, Ma(k) and Mi(k) are unlikely to be equal to each other.

For this reason, as a result of the calculation of the correlation value by expression (1), differences Ma(l)−Mi(l) and Ma(l+1)−Mi(l+1) when a sign of the correlation value Uk is inverted between K=l and K=l+1 are obtained. Then, the smaller one of the differences is set as the index FLVL representing the similarity between the A- and B-image signals.

The reliability of the phase difference AF process is determined by using the PB value and the index FLVL calculated in this manner according to a list below.

TABLE 1

|  | PB value | FLVL | Detected defocus |
|---|---|---|---|
| In-focus state is achievable | ≥First PB threshold | ≤First FLVL threshold | In first predetermined range |
| In-focus position estimation is possible | ≥Second PB threshold | ≤First FLVL threshold | — |
| Direction detection is possible | ≥Third PB threshold | ≤Second FLVL threshold | — |
| NG | <Third PB threshold | >Second FLVL threshold | — |

The determination that "in-focus is achievable" is made in a case in which, as a result of the phase difference AF process, the PB value is equal to or larger than a first PB threshold, the index FLVL is equal to or smaller than a first FLVL threshold and the defocus amount d calculated through the following process (step S610) in a first predetermined range indicating the in-focus state. This is a case in which the in-focus state can be obtained only by the phase difference AF process.

The determination that "in-focus position estimation is possible" is made in a case in which the PB value is equal to or larger than a second PB threshold and smaller than the first PB threshold and in which the index FLVL is equal to or smaller than the first FLVL threshold. In this case, it can be estimated at the following process (step S610) that the in-focus position exists near the position of the focus lens 33 moved by the movement amount calculated based on the defocus amount.

The determination that "direction detection is possible" is made in a case in which, the PB value is equal to or larger than a third PB threshold and smaller than the second PB threshold and in which the index FLVL is equal to or smaller than the first FLVL threshold. This determination is also made in a case in which the PB value is equal to or larger than the third PB threshold and in which the index FLVL is larger than the first FLVL threshold and equal to or smaller than a second FLVL threshold. In these cases, the defocus amount cannot be used but the defocus direction can be used for the AF processes.

The determination of "NG" is made in a case in which the PB value is smaller than the third PB threshold or the index FLVL is larger than the second FLVL threshold. In this case, both of the defocus amount and direction cannot be used for the AF processes.

When the determinations of "in-focus state is achievable", "in-focus position estimation is possible" and "direction detection is possible" are made, the CPU 15 determines that the result of the phase difference AF process is reliable and proceeds from step S609 to step S610. On the other hand, when the determination of "NG" is made, the CPU 15 determines the result of the phase difference AF process is not reliable and proceeds to step S612.

At steps S610 and S611, the CPU 15 calculates the movement amount of the focus lens 33 corresponding to the defocus amount. First, at step S610, the CPU 15 calculates an image shift amount at which the correlation value becomes zero. The correlation value is calculated while the B-image signal corresponding to the reference image is shifted one by one pixel relative to the A-image signal corresponding to the base image. Thus, the correlation value calculated by the phase difference AF process circuit 13 is unlikely to be zero. For this reason, the CPU 15 calculates, from two correlation values having mutually different signs and an image shift amount giving these correlation values, the image shift amount at which the correlation value becomes zero.

When the sign of the correlation value Uk is inverted between K=l and K=l+1 as the result of the calculation of the correlation value by expression (1), the image shift amount δ at which the correlation value becomes zero is calculated as follows by a linear interpolation:

$$\delta = l + |U_l|/[|U_l| + |U_{l+1}|]$$

where |z| represents an absolute value of z.

Next, at step S611, the CPU 15 calculates a prediction amount P by using the image shift amount δ as follows:

$$P = \delta - \Delta$$

where Δ represents a shift amount of the A- and B-image signals in the in-focus state.

Then, the CPU 15 calculates, from the prediction amount P and by using a base length dependent on the properties of the interchangeable lens (image capturing optical system), the defocus amount d, that is, the movement amount of the focus lens 33 (and moving direction), as follows:

$$d = K \cdot P$$

where K is a coefficient (K value) for converting the prediction amount P into the defocus amount; the K value depends on parameters such as the focal length and the aperture value of the interchangeable lens 31 and the image height. Thus, the camera EEPROM 19 previously stores a table of the K value as a function of these parameters, and the CPU 15 reads, from the table, the K value corresponding to the focal length, the aperture value and the image height. Then, the CPU 15 ends this process.

[Embodiment 2]

Next, description will be made of Embodiment 2 of the present invention. Embodiment 1 described the case in which the data of the design and manufacturing-error parameters or the BF correction value are stored for the four zoom positions (Wide, Middle1, Middle2 and Tele) and the three focus positions (Far, Intermediate and Near). However, storing data for all of these large numbers of zoom positions and focus positions requires a significantly large storage capacity. On the other hand, storing data of the focus position only for the three positions of Far, Intermediate and Near may not be enough to provide a sufficient correction accuracy.

For this reason, in this embodiment, though the BF correction value is calculated through substantially the same procedure as that of Embodiment 1 (FIGS. 2A to 2B), an interpolation of the BF correction value is performed for the zoom position and the focus position at step S128.

First, description will be made of a case in which the second interchangeable lens not holding the data of the manufacturing-error parameters is attached to the camera 1. When the CPU 15 has performed the processes up to step S128 according to the flowchart illustrated in FIGS. 2A to 2B, the BF correction value (design BF correction value) for the second interchangeable lens is stored in the camera EEPROM 19 for each zoom position, focus position and image height.

When the corrected in-focus position is calculated, the in-focus target image height, the zoom position and the focus position d are already determined, so that the CPU 15 reads the BF correction value corresponding to the image height, zoom position and focus position from the camera EEPROM 19. However, in this embodiment, the interpolation is performed for the zoom position and the focus position, and thus the CPU 15 reads the BF correction values corresponding to multiple zoom positions and focus positions neighboring the determined zoom position and focus position.

In this example, the CPU 15 calculates the in-focus position for the zoom position "zoom" and the focus position "focus". Assume that "zoom" is between Zoom_a and Zoom_b and "focus" is between focus_a and focus_b. In this case, the interpolation is performed as follows. In the following, the zoom position is represented as the focal length, and the focus position is represented as a movement amount (in μm, for example) from a position of the focus lens 33 that is in focus on infinity.

BF(x,y,Zoom,focus) is the BF correction value for the in-focus target image height (x,y), the zoom position "zoom" and the focus position "focus". BF(x,y,Zoom_a.focus_a) is the BF correction value for the image height (x,y), the zoom position "zoom_a" and the focus position "focus_a". BF(x,y,Zoom_a.focus_b) is the BF correction value for the image height (x,y), the zoom position "zoom_a" and the focus position "focus_b". BF(x,y,Zoom_b.focus_b) is the BF correction value for the image height (x,y), the zoom position "zoom_b" and the focus position "focus_b".

$$BF(x,y,Zoom.focus)=BF(x,y,Zoom\_a.focus\_a)+[BF(x,y,Zoom\_b.focus\_a)-BF(x,y,Zoom\_a.focus\_a)]\cdot(Zoom-Zoom\_a)/(Zoom\_b-Zoom\_a)+[BF(x,y,Zoom\_b.focus\_b)-BF(x,y,Zoom\_a.focus\_a)]\cdot(focus-focus\_a)/(focus\_b-focus\_a)$$

As described in Embodiment 1, as for the image height, the defocus amount obtained by the phase difference AF process and the AF evaluation value obtained by the scanning AF process at an image height other than the in-focus target image height in some cases. In such a case, the BF correction value corresponding to the in-focus target image height may be calculated by an interpolation using the BF correction values at multiple image heights neighboring the in-focus target image height. Thus, the interpolation of the BF correction value for the zoom position and the focus position is performed at multiple neighboring coordinates of the image heights.

Next, description will be made of a case in which the first interchangeable lens holding the data of the manufacturing-error parameters is attached to the camera 1. When the CPU 15 has performed the processes up to step S128 according to the flowchart illustrated in FIGS. 2A to 2B, the design parameters and the manufacturing-error parameters of the first interchangeable lens are already stored in the camera EEPROM 19 for each zoom position, focus position and image height.

At this stage, the in-focus target image height, the zoom position and the focus position are already determined. Thus, the CPU 15 calculates the design BF correction value and the manufacturing-error BF correction value for the image height, the zoom position and the focus position from the design and manufacturing-error parameters read from the camera EEPROM 19. As mentioned above, for the image height, the defocus amount obtained by the phase difference AF process and the AF evaluation value obtained by the scanning AF process at an image height other than the in-focus target image height may be used in some cases. In such a case, the BF correction value corresponding to the in-focus target image height may be calculated by an interpolation using the BF correction values at multiple image heights neighboring the in-focus target image height.

The method of calculating the design BF correction value is the same as that of calculating the BF correction value for the second interchangeable lens. The method of calculating the manufacturing-error BF correction value is the same as that of calculating the BF correction value for the second interchangeable lens in that the interpolation is performed for the zoom position and the focus position. However, when the interpolation is performed for the image height, similarly to Embodiment 1, signs of coordinates representing the image height are taken into account.

As for the image height, a fitting function such as a quadratic function and a cubic function may be stored as parameters to calculate each BF correction value.

Then, the CPU 15 calculates the combined BF correction value as the sum of the design and manufacturing-error BF correction value thus calculated and then calculates the corrected in-focus position by adding the combined BF correction value to the AF in-focus position. Then, the CPU 15 moves the focus lens 33 to the corrected in-focus position.

Although each of the embodiments above exemplarily described a so-called mirror-less lens interchangeable camera, alternative embodiments of the present invention include other lens interchangeable cameras such as a single-lens reflex camera and a digital video camera.

In each of the embodiments, for the second interchangeable lens not holding its unique correction value calculation data, the correction values are previously stored in the focus control apparatus (that is, the image capturing apparatus) and are used to perform focus control, thereby achieving fast focusing with a sufficient accuracy. On the other hand, for the first interchangeable lens holding its unique correction value calculation data, the correction value calculated from the correction value calculation data is used to perform focus control, thereby achieving a high focusing accuracy depending on an individual difference of the first interchangeable lens.

[Other Embodiments]

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-183103, filed on Sep. 9, 2014, which is hereby incorporated by reference wherein in its entirety.

What is claimed is:

1. An image capturing apparatus to which an interchangeable lens is detachably attachable, the image capturing apparatus being configured to capture an object image formed by the interchangeable lens, the image capturing apparatus comprising:

a focus detector configured to detect a focus state of the interchangeable lens; and a controller configured to perform focus control of the interchangeable lens by using information obtained through the detection of the focus state and a correction value corresponding to the interchangeable lens, the interchangeable lens being one of a first interchangeable lens and a second interchangeable lens, each attachable to the image capturing apparatus, the first interchangeable lens holding correction value calculation data that is used to calculate the correction value and is unique to the first interchangeable lens, the second interchangeable lens not holding the correction value calculation data;

a first memory storing values for calculating the correction value corresponding to the second interchangeable lens; and a correction value calculator calculating the correction value when the first interchangeable lens is attached to the image capturing apparatus, wherein the controller is configured to:
perform, when the second interchangeable lens is attached to the image capturing apparatus, the focus control by using the correction value calculated based on the values read from the first memory, and
perform, when the first interchangeable lens is attached to the image capturing apparatus, the focus control by using the correction value calculated by the correction value calculator based on the correction value calculation data acquired from the first interchangeable lens, and wherein the values stored in the first memory are values for correcting a change of an in-focus position caused by an aberration of the second interchangeable lens depending on a designed value, and the correction value calculation data that is held by the first interchangeable lens and that is unique to the first interchangeable lens is data for correcting a change of an in-focus position caused by an aberration of the first interchangeable lens depending on an individual difference due to a manufacturing error of the first interchangeable lens.

2. An image capturing apparatus according to claim 1, further comprising a second memory configured to store the correction value calculated by using the correction value calculation data acquired from the first interchangeable lens,
wherein the controller is configured to perform, when the first interchangeable lens of which the correction value is stored in the second memory is again attached to the image capturing apparatus, the focus control by using the correction value stored in the second memory.

3. An image capturing apparatus according to claim 1, wherein the correction value calculation data is data of an imaging position for each of at least one of a focal length of the first interchangeable lens, an object distance, and a spatial frequency and an image height of an object image formed by the first interchangeable lens.

4. An image capturing apparatus according to claim 1, wherein the correction value and the correction value calculation data have data structures different from each other.

5. An image capturing apparatus according to claim 1, wherein the correction value calculator calculates the correction value based on information related to a spatial frequency of an image signal used for detecting the focus state by the focus detector and information related to a spatial frequency of an image signal in a captured image.

6. An image capturing apparatus according to claim 1, wherein the correction value calculator calculates the correction value based on information related to a color component of an image signal used for detecting the focus state by the focus detector and information related to a color component of an image signal in a captured image.

7. An image capturing apparatus according to claim 1, wherein the correction value calculation data is data showing an imaging position dependent on a color component of an object image formed by the first interchangeable lens.

8. An image capturing apparatus according to claim 1, wherein the correction value calculation data is data showing an imaging position dependent on a spatial frequency of an image signal formed by the first interchangeable lens.

9. A method for controlling an image capturing apparatus to which an interchangeable lens is detachably attachable and which is configured to capture an object image formed by the interchangeable lens, the method comprising:
a detection step of detecting a focus state of the interchangeable lens; and
a control step of performing focus control of the interchangeable lens by using information obtained through the detection of the focus state and a correction value corresponding to the interchangeable lens,
wherein the interchangeable lens is one of a first interchangeable lens and a second interchangeable lens, each attachable to the image capturing apparatus, the first interchangeable lens holding correction value calculation data that is used to calculate the correction value and is unique to the first interchangeable lens, the second interchangeable lens not holding the correction value calculation data,
wherein the control step includes:
performing, when the second interchangeable lens is attached to the image capturing apparatus, the focus control by using the correction value calculated based on values read from a memory included in the image capturing apparatus; and
performing, when the first interchangeable lens is attached to the image capturing apparatus, the focus control by using the correction value calculated based on the correction value calculation data acquired from the first interchangeable lens, and
wherein the values stored in the memory are values for correcting a change of an in-focus position caused by an aberration of the second interchangeable lens depending on a designed value, and the correction value calculation data that is held by the first interchangeable lens and that is unique to the first interchangeable lens is data for correcting a change of an in-focus position caused by an aberration of the first interchangeable lens depending on an individual difference due to a manufacturing error of the first interchangeable lens.

10. A non-transitory computer-readable storage medium that stores a focus control program as a computer program for causing a computer of an image capturing apparatus to which an interchangeable lens is detachably attachable and which is configured to capture an object image formed by the interchangeable lens, to perform an operation, the operation comprising:
a detection step of detecting a focus state of the interchangeable lens; and
a control step of performing focus control of the interchangeable lens by using information obtained through the detection of the focus state and a correction value corresponding to the interchangeable lens,
wherein the interchangeable lens is one of a first interchangeable lens and a second interchangeable lens, each attachable to the image capturing apparatus, the first interchangeable lens holding correction value calculation data that is used to calculate the correction value and is unique to the first interchangeable lens, the second interchangeable lens not holding the correction value calculation data,
wherein in the control step:
  the operation performs, when the second interchangeable lens is attached to the image capturing apparatus, the focus control by using the correction value calculated based on values read from a memory included in the image capturing apparatus; and
  the operation performs, when the first interchangeable lens is attached to the image capturing apparatus, the focus control by using the correction value calculated based on the correction value calculation data acquired from the first interchangeable lens, and
wherein the values stored in the memory are values for correcting a change of an in-focus position caused by an aberration of the second interchangeable lens depending on a designed value, and the correction value calculation data that is held by the first interchangeable lens and that is unique to the first interchangeable lens is data for correcting a change of an in-focus position caused by an aberration of the first interchangeable lens depending on an individual difference due to a manufacturing error of the first interchangeable lens.

* * * * *